United States Patent
Lee et al.

(10) Patent No.: US 12,125,019 B2
(45) Date of Patent: Oct. 22, 2024

(54) ELECTRONIC DEVICE SUPPORTING MOBILE PAYMENT, METHOD FOR OPERATING SAME, AND STORAGE MEDIUM

(71) Applicant: Samsung Electronics Co., Ltd., Suwon-si (KR)

(72) Inventors: Yongwan Lee, Suwon-si (KR); Inho Kim, Suwon-si (KR); Yongseok Park, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 17/671,050

(22) Filed: Feb. 14, 2022

(65) Prior Publication Data

US 2022/0172192 A1    Jun. 2, 2022

Related U.S. Application Data

(63) Continuation of application No. PCT/KR2021/006064, filed on May 14, 2021.

(30) Foreign Application Priority Data

Jul. 9, 2020    (KR) ........................ 10-2020-0084870

(51) Int. Cl.
*G06Q 20/32*    (2012.01)
*G06Q 20/40*    (2012.01)

(52) U.S. Cl.
CPC ..... *G06Q 20/3224* (2013.01); *G06Q 20/3267* (2020.05); *G06Q 20/40* (2013.01)

(58) Field of Classification Search
CPC . G06Q 20/3224; G06Q 20/3267; G06Q 20/40
(Continued)

(56) References Cited

U.S. PATENT DOCUMENTS

2015/0242840 A1* 8/2015 Kursun ............ G06Q 20/40145
705/44
2016/0247144 A1* 8/2016 Oh ......................... G06K 7/083
(Continued)

FOREIGN PATENT DOCUMENTS

KR    10-2013-0065749 A    6/2013
KR    10-2016-0105297    *    9/2016    ............ H04W 12/06
(Continued)

OTHER PUBLICATIONS

Korean Office Action dated Jun. 20, 2024, issued in Korean Patent Application No. 10-2020-0084870.

*Primary Examiner* — Hai Tran

(74) *Attorney, Agent, or Firm* — Jefferson IP Law, LLP

(57) ABSTRACT

An electronic device is provided. The electronic device includes a communication module, at least one processor, and a memory configured to be operatively coupled to the at least one processor, wherein the memory stores instructions configured to, when executed, cause the at least one processor to identify information on a first country in which the electronic device is located through the communication module, perform payment based on a first authentication method corresponding to the identified information on the first country in response to a first payment application execution request, and change the first authentication method to a second authentication method corresponding to information on a second country in response to detection of a change from the first country to the second country through the communication module.

17 Claims, 14 Drawing Sheets

(58) Field of Classification Search
USPC .............................................. 705/44; 704/44
See application file for complete search history.

(56) References Cited

U.S. PATENT DOCUMENTS

| | | |
|---|---|---|
| 2017/0046686 A1 | 2/2017 | Yoon et al. |
| 2018/0165677 A1 | 6/2018 | Kohli |
| 2019/0026725 A1* | 1/2019 | Park ................. G06Q 20/40145 |
| 2019/0180257 A1 | 6/2019 | Lee et al. |
| 2021/0150498 A1* | 5/2021 | Fukuizumi ............ H04M 15/70 |

FOREIGN PATENT DOCUMENTS

| | | |
|---|---|---|
| KR | 10-2016-0105297 A | 9/2016 |
| KR | 10-1695699 B1 | 1/2017 |
| KR | 10-2017-0039642 A | 4/2017 |
| KR | 10-2017-0086957 A | 7/2017 |
| KR | 10-2017-0099346 A | 8/2017 |
| KR | 10-2019-0067588 A | 6/2019 |
| KR | 10-2020-0030089 A | 3/2020 |

* cited by examiner

ELECTRONIC DEVICE SUPPORTING MOBILE PAYMENT, METHOD FOR OPERATING SAME, AND STORAGE MEDIUM

CROSS-REFERENCE TO RELATED APPLICATION(S)

This application is a continuation application, claiming priority under § 365(c), of an International application No. PCT/KR2021/006064, filed on May 14, 2021, which is based on and claims the benefit of a Korean patent application number 10-2020-0084870, filed on Jul. 9, 2020, in the Korean Intellectual Property Office, the disclosure of which is incorporated by reference herein in its entirety.

TECHNICAL FIELD

The disclosure relates to an electronic device supporting mobile payment, a method for operating the same, and a storage medium. More particularly, the disclosure relates to an electronic device and a method for identifying information on a first country in which the electronic device is located, performing payment based on a first authentication method corresponding to information on the identified first country in response to a first payment application execution request, and changing the first authentication method to a second authentication method corresponding to information on a second country in response to detection of a change from the first country to the second country.

BACKGROUND ART

In the case of a credit card payment, the amount of payment to be made to purchase or spend a product may be calculated by a point of sales (POS) terminal at a store, and may be authenticated by a means for paying the amount (for example, a user's credit card), thereby requesting payment. The corresponding payment information may be transferred to a server of a bank or credit card company through a value added network (VAN) connected to the POS terminal, the corresponding payment information may be approved by the server of the credit card company (or bank), and a secondary user authentication (for example, signature) may then be transferred from the POS terminal to the server through the VAN, thereby completing the payment.

Various payment methods are used as a result of commercialization of wireless payment systems. For example, credit card information may be pre-registered in an electronic device such that, instead of manual use of the credit card by the user, the electronic device is used for payment. For example, an electronic device may use a mobile payment service to provide a payment function regarding a purchase made online of offline. In addition, if a payment is confirmed through user fingerprint recognition during mobile payment, the payment can be made through a simple procedure with a high level of security, and payment methods using electronic devices are accordingly widely used.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

In view of the above-mentioned convenience in that payment can be completed through a simple authentication procedure using electronic devices always carried by users, a method for facilitating an overseas mobile payment method may be proposed.

For example, in the case of a technology for authenticating users by using biometric information, system structures and operations of various servers included in a payment system are constructed to apply a biometric authentication service to an online payment system. However, even if authentication methods of form of payment are diversified, an application that directly provides a payment service performs payment according to a designated authentication method, meaning that, if the mobile payment is to be used in a region other than the nation in which the form of payment for mobile payment has been issued, it may be difficult to satisfy security requirements or performance requirements of the partner company. For example, the application provides an authentication method based on fixed nation information, and there may be restrictions on changing the determined authentication method to another.

Therefore, there is a need to consider a structural change in the structural part of the wireless payment system and/or software-related aspect thereof, in order to control overseas mobile payment functions while satisfying various requirements.

Aspects of the disclosure are to address at least the above-mentioned problems and/or disadvantages and to provide at least the advantages described below. Accordingly, an aspect of the disclosure is to provide an electronic device supporting mobile payment, a method for operating the same, and a storage medium.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module, at least one processor, and a memory configured to be operatively coupled to the at least one processor, wherein the memory stores instructions configured to, when executed, cause the at least one processor to identify information on a first country in which the electronic device is located through the communication module, perform payment based on a first authentication method corresponding to the identified information on the first country in response to a first payment application execution request, and change the first authentication method to a second authentication method corresponding to information on a second country in response to detection of a change from the first country to the second country through the communication module.

In accordance with another aspect of the disclosure, a method for supporting mobile payment in an electronic device is provided. The method includes identifying information on a first country in which the electronic device is located, performing payment based on a first authentication method corresponding to information on the identified first country in response to a first payment application execution request, and changing the first authentication method to a second authentication method corresponding to information on a second country in response to detection of a change from the first country to the second country.

According to an embodiment of the disclosure, in connection with a storage medium storing instructions, the instructions may be configured to cause at least one processor to perform at least one operation when the instructions are executed by the at least one processor, the at least one operation including identifying information on a first country in which the electronic device is located, performing payment based on a first authentication method corresponding to information on the identified first country in response to a first payment application execution request, and changing the first authentication method to a second authentication method corresponding to information on a second country in response to detection of a change from the first country to the second country.

Advantageous Effects

According to an embodiment of the disclosure, when mobile payment is to be used in a region other than the nation in which a form of payment for mobile payment has been issued, security requirements or performance requirements of a partner company can be satisfied.

According to an embodiment of the disclosure, a biometric authentication method for a form of payment is dynamically provided such that a biometric authentication method can be independently used not only with regard to each nation, but also according to security requirements or performance requirements of the partner company.

According to an embodiment of the disclosure, when payment is to be made overseas, an electronic device may authenticate a stored token through an external server in order to use the stored token according to a changed authentication method, thereby using the changed authentication method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined otherwise, all terms used herein, including technical terms and scientific terms, may have the same meaning as commonly understood by a person of ordinary skill in the art to which the disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, eve the terms defined herein may not be construed to exclude embodiments of the disclosure.

Figure 1:
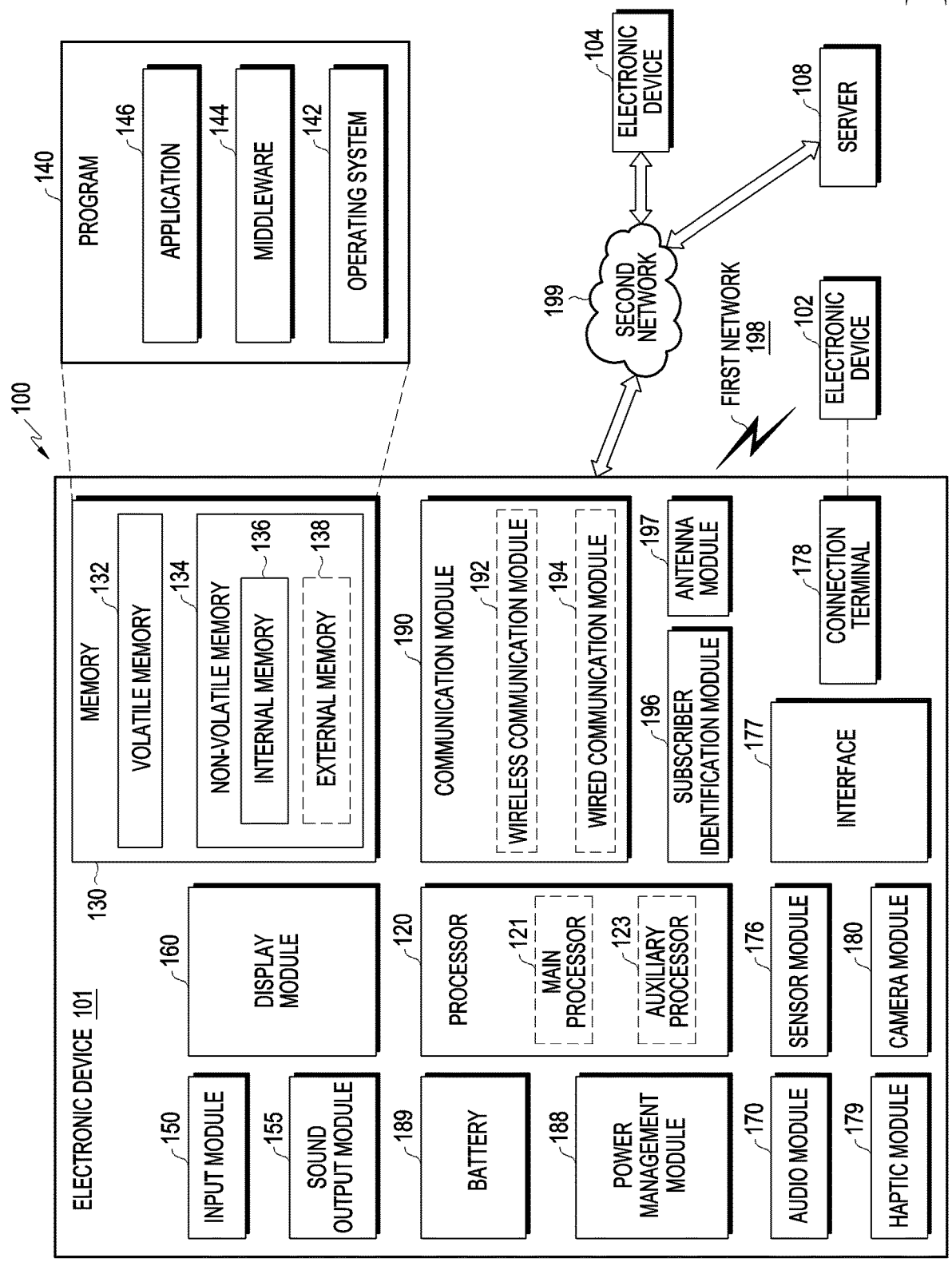
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., an external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), a serial peripheral interface (SPI), or a mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
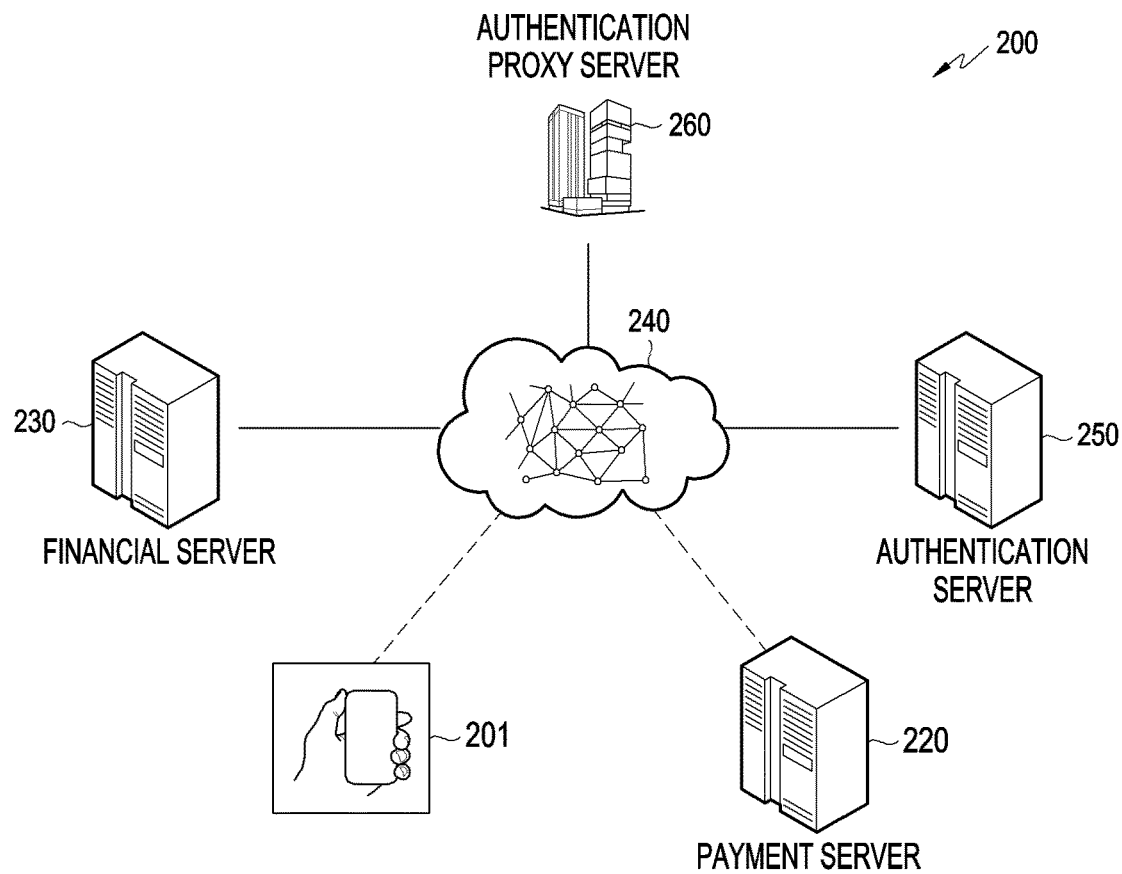
FIG. 2 is a diagram illustrating a configuration of a payment system according to an embodiment of the disclosure.

FIG. 2 is a diagram 200 illustrating a configuration of a payment system according to an embodiment of the disclosure.

Referring to FIG. 2, a payment system according to an embodiment may include an electronic device 201, a payment server 220, a financial server (issuer server) 230, an authentication server 250, and an authentication proxy server 260. The respective components of the payment system shown in FIG. 2 may be connected to one another through a network 240, for example, a mobile communication network or an Internet network.

According to an embodiment of the disclosure, the electronic device 201 may provide a payment service by using a payment application (e.g., a Samsung Pay™ application). According to an embodiment of the disclosure, the payment application may provide a user interface related to payment. For example, the payment application may provide a user interface related to card registration, payment, or transaction. In addition, the payment application may provide an interface related to user authentication through, for example, identification and verification (ID&V).

According to an embodiment of the disclosure, the electronic device 201 may store card information (or account information) linked to a payment service account (e.g., a Samsung account), a biometric authentication service account, and a user account.

According to an embodiment of the disclosure, the electronic device 201 may perform user authentication through a biometric authentication process. When a payment request is input from the user, the electronic device 201 may perform biometric authentication through the authentication proxy server 260 and the authentication server 250. According to an embodiment of the disclosure, when biometric authentication is completed, the electronic device 201 may receive a biometric authentication session key from the authentication proxy server 260.

According to an embodiment of the disclosure, the electronic device 201 may request a payment token from the payment server 220 and may transmit the biometric authentication session key to the payment server 220 together with the payment token request. Accordingly, the electronic device 201 may perform a payment using the payment token issued by the financial server 230.

According to an embodiment of the disclosure, the authentication proxy server 260 may request user authentication from the authentication server 250 according to the request of the electronic device 201. According to an embodiment of the disclosure, the authentication proxy server 260 may manage card information (or account information) linked to a payment service account (e.g., a Samsung account), a biometric authentication service account, and a user account.

Although the authentication server 250 and the authentication proxy server 260 are respectively illustrated in FIG. 2, the authentication server 250 and the authentication proxy server 260 may be configured as one server. Alternatively, the authentication proxy server 260 and the payment server 220 may be operated as one integrated server, and the operation performed by the authentication proxy server 260 may be performed by the payment server 220.

The authentication server 250 according to an embodiment may perform user authentication according to a request from the electronic device 201. The authentication server 250 may provide a fast identity online (FIDO) authentication service for performing user authentication using biometric information of the user. According to an embodiment of the disclosure, the authentication server 250 that provides a token issuance service using FIDO authentication may be referred to as a FIDO server. The authentication server 250 may perform user authentication using authentication information received from the electronic device 201. According to an embodiment of the disclosure, the authentication server 250 may transmit an authentication result to the authentication proxy server 260 when the user authentication is completed. The authentication result may be transmitted to the electronic device 201.

According to an embodiment of the disclosure, the payment server 220 may transmit and receive information to and from the electronic device 201 and the financial server 230. The payment server 220 may transmit the payment token request and the biometric authentication session key received from the electronic device 201 to the financial server 230. The payment server 220 may transmit the payment token received from the financial server 230 to the electronic device 201. According to an embodiment of the disclosure, the payment server 220 may be referred to as a PMT (payment) server, for example, a server of Samsung Pay. According to an embodiment of the disclosure, the payment server 220 may include various management servers for electronic payment or mobile payment, such as a payment service server and a token requestor server. In addition, the payment server 220 may receive payment-related information from the electronic device 201, and may transmit the received information to the outside or process the received information in the payment server 220 itself. According to an embodiment of the disclosure, the payment server 220 may transmit/receive information between the electronic device 201 and the financial server 230.

According to an embodiment of the disclosure, the financial server 230 may be a server operated by a card company or a bank. For example, the financial server 230 may be referred to as an issuer server. The financial server 230 may issue a card, may manage card information (or account information), and may finally determine whether to perform payment.

According to an embodiment of the disclosure, the financial server 230 may generate a payment token. The financial server 230 may generate a payment token and may transmit the generated payment token to the electronic device 201 through the payment server 220. According to an embodiment of the disclosure, the payment token may be generated in a token server (e.g., a token service provider) separate from the financial server 230 and may be transmitted to the electronic device 201. According to an embodiment of the disclosure, the financial server 230 may include a token server, and may issue payment data (e.g., a token) or manage payment data. For example, the financial server 230 may perform various functions related to the token, such as token configuration, identification and verification (ID&V), replenishment, and creation, modification, deletion, or control/management of a life cycle of the token.

According to an embodiment of the disclosure, a token issuance service using FIDO authentication may be largely classified into two cases. For example, the token issuance service may be classified into a one-time token method in which the electronic device 201 requests and receives a payment token each time the payment is made, and a storage token method in which a predetermined number of tokens are received and stored in the memory, and then the tokens stored in the memory are obtained at the time of payment and are used for payment.

According to an embodiment of the disclosure, the payment token may include a token that can be used once for a payment request and a plurality of tokens that can be stored in the electronic device 201. According to an embodiment of the disclosure, the plurality of tokens stored in the electronic device 201 may be disposable. When both the one-time token method and the storage token method are disposable, the token may be deleted after one payment. Therefore, when the plurality of tokens are exhausted and a predetermined number of tokens or less remains, the electronic device 201 may additionally request the token from the payment server 220, may receive the requested token from the financial server 230 interworking with the payment server 220, and may store the received token in advance.

Meanwhile, when a validity period is designated for the plurality of tokens stored in the electronic device 201, the tokens can be continuously and repeatedly used within the validity period. According to an embodiment of the disclosure, the electronic device 201 may store the token issued from the financial server 230 via the payment server 220, or may store the token issued by directly accessing the financial server 230.

According to an embodiment of the disclosure, when receiving one or a plurality of repeatably available payment tokens, the electronic device 201 may store the received payment token in a highly secure memory. For example, the electronic device 201 may store the payment token in a trusted execution environment (TEE) or an embedded secure element (eSE). The TEE is a memory included in a processor (e.g., an application processor) of the electronic device 201 and may correspond to an accessible memory area when the processor operates in a secure mode. According to an embodiment of the disclosure, the TEE may be implemented as a separate secure memory, but it may be implemented so that data is encrypted and stored in general memory and this encrypted data is only accessible by the TEE, and a detailed description thereof will be described with reference to FIG. 11.

Meanwhile, when the one-time token is received, the electronic device 201 may omit the process of storing the payment token.

According to an embodiment of the disclosure, the electronic device 201 may be subjected to security authentication on payment information (e.g., token) for each payment transaction by interacting with the payment server 220, and then may use the payment information at the time of payment.

According to an embodiment of the disclosure, the electronic device 201 may transmit the payment information to an external device (e.g., a point of sales (POS) (not shown)) through a short-range wireless communication circuit. Although the external device is omitted in FIG. 2 for convenience of description, the external device may be implemented to be included in the payment system.

For example, the electronic device 201 may transmit the payment information to the external device through various channels, such as a magnetic secure transmission (MST) channel and a near field communication (NFC) channel. In response, the external device may transmit the payment information to the payment server 220 and may complete the payment transaction by obtaining payment approval.

Meanwhile, according to an embodiment of the disclosure, the electronic device 201 may identify the location of the electronic device 201 and may determine whether a country of residence is changed based on the identified location. According to an embodiment of the disclosure, whether the country of residence has been changed may be confirmed using a mobile country code (MCC) or a mobile network code (MNC). Alternatively, the electronic device 201 may determine whether the country of residence has been changed by using a global positioning system (GPS) signal.

According to an embodiment of the disclosure, the electronic device 201 may perform payment by a first authentication method corresponding to a first country among a plurality of authentication methods, and may perform payment by a second authentication method corresponding to a second country when the country of residence is changed to the second country. According to an embodiment of the disclosure, the plurality of authentication methods may include at least one of a local authentication method, a trusted application (TA) authentication method, and a FIDO authentication method. Here, the FIDO authentication method may be classified into an authentication method for using a one-time token and an authentication method for using a stored token. Since different authentication methods are applied for each country as described above, the electronic device 201 may perform payment based on any one authentication method corresponding to the first country among the plurality of authentication methods. In addition, when the country of residence is changed, the electronic device 201 may change to a different authentication method corresponding to the second country and perform payment.

For example, when the electronic device 201 is located in the first country by interacting with the payment server 220, the electronic device 201 may request a payment token from the payment server 220 at the time of payment to receive a one-time payment token from the financial server 230 interworking with the payment server 220, thereby performing payment. On the other hand, when the location of the electronic device 201 is in the second country, the authentication method for using the one-time payment token used in the first country may be changed to an authentication method corresponding to the second country. For example, the electronic device 201 may change an authentication method for using a one-time payment token in the first country to an authentication method for using a plurality of tokens stored in the memory corresponding to the second country. Although the plurality of tokens can be used repeatedly, the electronic device 201 may perform authentication to obtain a token required for payment from the memory.

According to an embodiment of the disclosure, the electronic device 201 may obtain configuration information including at least one security policy to be applied at the time of payment when the country of residence is changed. According to an embodiment of the disclosure, the electronic device 201 may obtain the configuration information when the country of residence is changed, and may change to an authentication method corresponding to the changed country based on the configuration information.

According to an embodiment of the disclosure, the configuration information may include at least one security policy to be applied at the time of payment.

According to an embodiment of the disclosure, the at least one security policy may include at least one of a security policy supported by the electronic device 201 itself, a security policy for each country that supports overseas payment, a security policy for each form of payment (e.g., for each card) that supports overseas payment, a security policy according to a payment method (e.g., MST, NFC, quick response (QR), or barcode), and a security policy according to a payment amount.

For example, according to the security policy supported by the electronic device 201 itself, when supporting the FIDO authentication method, the electronic device 201 may request to authenticate the user using the FIDO authentication method. Here, the security policy supported by the electronic device 201 itself is a security policy used by the electronic device 201 before moving to a country, and may be, for example, an authentication method currently being used before moving to the country.

In addition, for example, according to a country-specific security policy that supports overseas payment, a first country (e.g., Korea) may require authentication of the user to use a one-time token method, a second country (e.g., European country) may require authentication of the user using a TA authentication method, and a third country (e.g., the United States) may require to authenticate the user to use the TA authentication method or the stored token.

In addition, for example, according to the security policy for each form of payment that supports overseas payment (e.g., for each card), card company A may require to perform authentication using a first authentication method at the time of card registration, payment, or deletion, and card company B may require to perform authentication using a second authentication method.

As described above, the authentication method may be dynamically changed according to the configuration information including at least one policy, and according to an embodiment of the disclosure, the configuration information as described above may be obtained automatically or a user's selection when a change in the country of residence is detected. According to an embodiment of the disclosure, the configuration information may be stored in the memory when the payment application is installed or updated in the electronic device 201. Alternatively, when the payment application is used for payment after the country of residence is changed, the configuration information may be updated and stored.

As described above, according to an embodiment of the disclosure, the electronic device 201 may obtain the configuration information when the country of user's residence is changed, instead of an authentication method designated for the country, so that an authentication method for a country in which the user is currently located may be determined based on the configuration information. For example, when the electronic device 201 uses a first authentication method (e.g., a first FIDO authentication method) for using a one-time token in a first country (e.g., Korea) and then moves to a second country (e.g., the United States) that requires a TA authentication method, the authentication method may be changed to a second authentication method (e.g., a second FIDO authentication method) for using a stored token for the United States based on the obtained configuration information. Accordingly, even if the TA method is generally used in the second country (e.g., the United States), the authentication method can be dynamically changed to the second authentication method based on the obtained configuration information. According to an embodiment of the disclosure, since the authentication method can be changed according to the form of payment selected by the user, the authentication method may be actually changed based on the configuration information in response to reception of a user's selection of the form of payment in the electronic device 201.

As described above, according to an embodiment of the disclosure, the authentication method may be dynamically changed based on a biometric authentication method that can be supported when a country is changed and a user payment scenario.

Meanwhile, according to an embodiment of the disclosure, a detailed description of configuration information serving as a standard in determining an authentication method corresponding to a country of residence will be described later.

Figure 3:
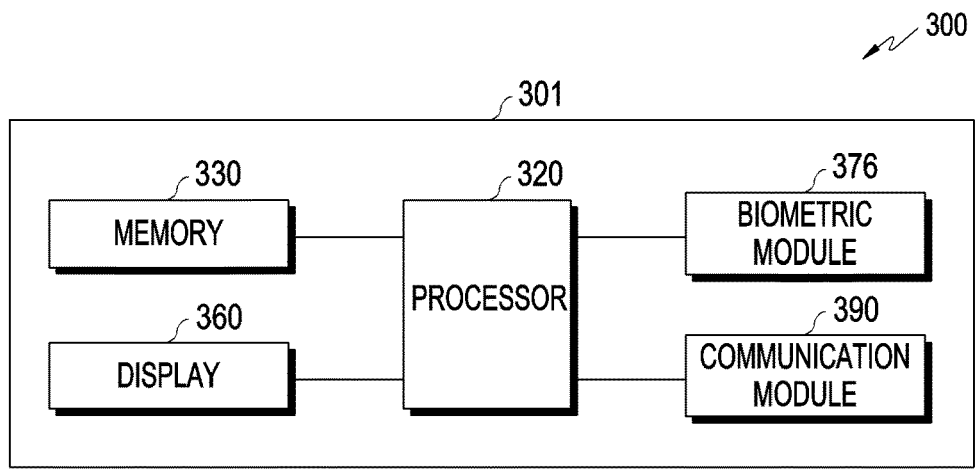
FIG. 3 is an internal block diagram illustrating an electronic device for dynamically changing an authentication method according to an embodiment of the disclosure.

FIG. 3 is an internal block diagram 300 illustrating an electronic device for dynamically changing an authentication method according to an embodiment of the disclosure.

Referring to FIG. 3, an electronic device 301 (e.g., the electronic device 101 of FIG. 1 and the electronic device 201 of FIG. 2) may include a processor 320, a memory 330, a display 360, a biometric module 376, and a communication module 390.

According to an embodiment of the disclosure, the display 360 may display a screen for payment-related items according to, for example, execution of a payment application.

According to an embodiment of the disclosure, the biometric module 376 may receive biometric information for user authentication. For example, the biometric information may include fingerprint information, iris information, face information, and/or voice information. Although the biometric module 376 is illustrated in FIG. 3, authentication information may be used instead of biometric information, and for this purpose, the electronic device 301 may further include an authentication module (not shown). For example, the authentication information may be a designated pattern input, a designated gesture input, a password, or a pin code.

According to an embodiment of the disclosure, the communication module 390 may transmit and receive information for payment to and from an external server. According to an embodiment of the disclosure, the communication module 390 may transmit and receive information related to payment to and from a payment server (e.g., the payment server 220 of FIG. 2), and may transmit and receive authentication information to and from an authentication server (e.g., the authentication server 250 of FIG. 2). According to an embodiment of the disclosure, the communication module 390 may receive information for identifying a country of residence from a network operator.

According to an embodiment of the disclosure, the memory 330 may store at least one card information linked to a payment service account, a biometric authentication service account, and a user account, or authentication information corresponding to the at least one card information. The memory 330 may store other various types of payment-related information. According to an embodiment of the disclosure, the memory 330 may store at least one piece of payment data (e.g., token), and may store biometric information registered by a user or authentication information related to biometric information.

According to an embodiment of the disclosure, the processor 320 may control the memory 330, the display 360, the biometric module 376, and the communication module 390 to perform biometric authentication-based overseas payment.

According to an embodiment of the disclosure, when a payment application is executed and a payment request is received, the processor 320 may control to perform biometric authentication based on configuration information corresponding to a country in which the user currently resides. The configuration information may be information serving as a reference for determining an authentication method corresponding to a country in which the user resides.

According to an embodiment of the disclosure, in a first country (e.g., Korea), the processor 320 may perform payment in a method for using first FIDO authentication and a one-time token (e.g., OTT) among a plurality of authentication methods. On the other hand, in a foreign country, such as a second country (e.g., the United States), an authentication method in which a designated number of tokens is stored in the memory 330 of the electronic device 301 and payment is performed may be used. Here, in order to pre-store a designated number of tokens in the memory 330 of the electronic device 301, authentication may be performed on an issued payment token.

According to an embodiment of the disclosure, this authentication process may be the same as that in an authentication screen for payment, and the processor 320 may use a first FIDO authentication method used in the first country (e.g., Korea) to authenticate biometric information, thereby receiving a plurality of payment tokens from an external server (e.g., the financial server 230 {or issuer server} of FIG. 2). Here, the plurality of payment tokens may be one-time use or may be used repeatedly when a validity period or the number of uses is determined. When the plurality of payment tokens are all disposable, they may be deleted after one payment. In this case, the processor 320 may determine whether stored payment tokens are exhausted at the time of payment, and may additionally receive and store a one-time token through communication with the external server (e.g., the financial server 230 {or issuer server} of FIG. 2) when the designated number of payment tokens or less remain. For example, in a case in which a plurality of tokens are used for each payment, when a designated number of tokens or less are left, the processor 320 may receive the same number of the tokens as the number of the exhausted payment tokens or a predetermined number of tokens from the external server (e.g., the financial server 230 {or issuer server} of FIG. 2). For example, the processor 320 may receive tokens that can be used for a certain period of time or can use one token continuously.

According to an embodiment of the disclosure, when all valid payment tokens are exhausted (e.g., when there are no token), the processor 320 may request issuance of a predetermined number of payment tokens from the external server (e.g., the financial server 230 {or issuer server} of FIG. 2) and may store the requested payment tokens. Alternatively, when the number of valid payment tokens is less than or equal to a certain number, the processor 320 may additionally request issuance of the payment token through communication with the external server, and may receive and store the requested payment token.

Next, when a payment is attempted by a user request in a state in which a plurality of tokens are stored in the memory 330, the processor 320 according to an embodiment may display a user authentication screen to use the stored token at the time of payment. For example, an authentication screen for receiving user biometric information may be displayed, and when verification of biometric information is successful as a result of authentication, the stored payment token may be transferred to a payment device (e.g., POS) through various channels, such as MST or NFC.

According to an embodiment of the disclosure, an electronic device (e.g., the electronic device 101 of FIG. 1, the electronic device 201 of FIG. 2, or the electronic device 301 of FIG. 3) may include a communication module 390, at least one processor 320, and a memory 330 configured to be operatively coupled to the at least one processor 320, wherein the memory 330 may store instructions configured to, when executed, cause the at least one processor 320 to identify information on a first country in which the electronic device 301 is located through the communication module 390, perform payment based on a first authentication method corresponding to the identified information on the first country in response to a first payment application execution request, and change the first authentication method to a second authentication method corresponding to information on a second country in response to detection of a change from the first country to the second country through the communication module 390.

According to an embodiment of the disclosure, the first authentication method may be a method in which a payment token required to perform payment is issued from an external server at every payment, and the second authentication method may be a method in which any one of a plurality of pre-stored payment tokens is used.

According to an embodiment of the disclosure, the instructions may be configured to cause the at least one processor 320 to obtain configuration information including at least one security policy to be applied at the time of payment corresponding to the second country, in response to detection of a change from the first country to the second country.

According to an embodiment of the disclosure, the instructions may be configured to cause the at least one processor 320 to change to a second authentication method corresponding to the second country based on the configuration information, in response to a second payment application execution request.

According to an embodiment of the disclosure, the at least one security policy may include at least one of a security policy supported by the electronic device itself, a security policy for each country supporting overseas payment, a security policy for each form of payment supporting overseas payment, a security policy according to a payment method, and a security policy according to a payment amount.

According to an embodiment of the disclosure, the instructions may be configured to cause the at least one processor to issue a device nonce (or random number) for authentication on the plurality of pre-stored payment tokens in response to the second payment application execution request, transmit the device nonce to a payment server connected to a financial server to perform authentication between the financial server and an authentication server, and complete authentication of the plurality of pre-stored payment tokens by receiving a verification result for the device nonce from the payment server.

According to an embodiment of the disclosure, the instructions may be configured to cause the at least one processor 320 to request authentication on biometric information from the authentication server in response to the second payment application execution request, and transmit the device nonce to the payment server when the authentication on the biometric information by the authentication server is successful.

According to an embodiment of the disclosure, the instructions may be configured to cause the at least one processor 320 to display a guidance for payment in the second country in response to detection of a change from the first country to the second country.

According to an embodiment of the disclosure, the instructions may be configured to cause the at least one processor 320 to obtain configuration information including at least one security policy to be applied at the time of payment corresponding to the second country in response to reception of a user's selection after displaying the guidance for payment in the second country.

According to an embodiment of the disclosure, the instructions may be configured to cause the at least one processor 320 to detect the change from the first country to the second country based on at least one of a mobile country code (MCC), a mobile network code (MNC), and GPS location information.

Figure 4:
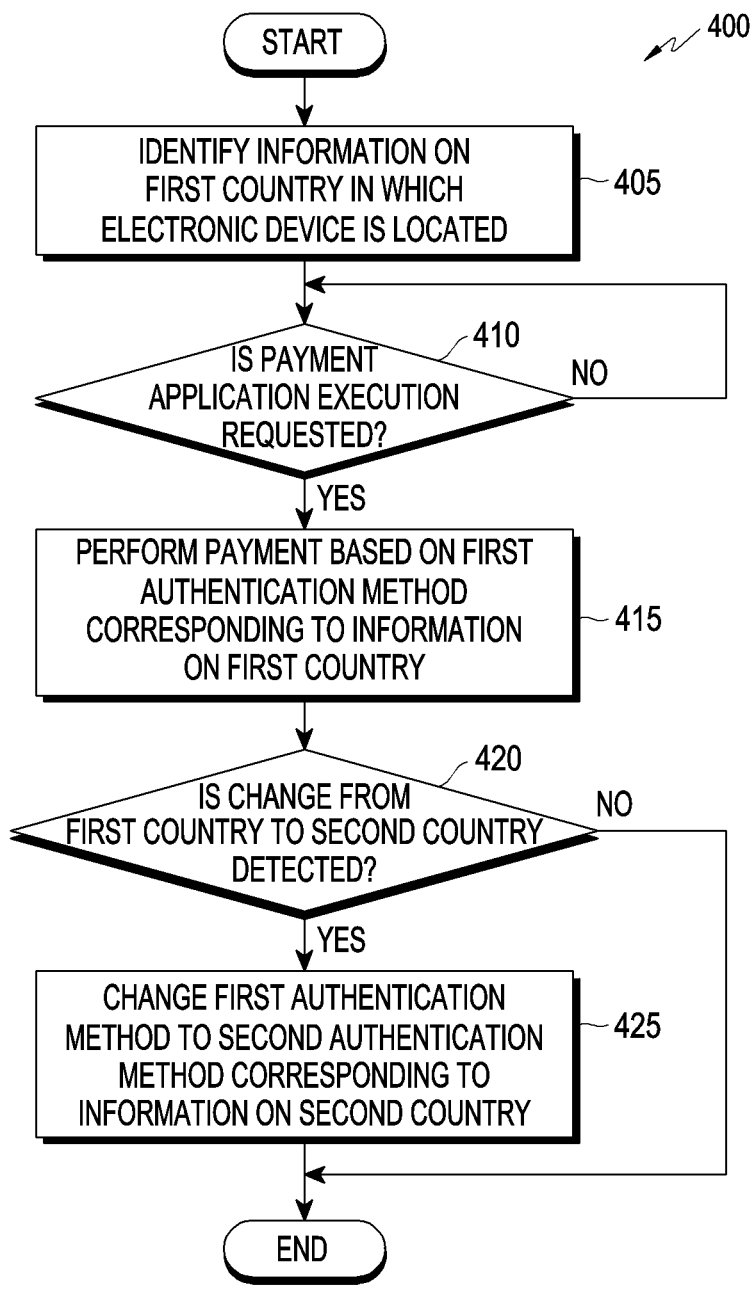
FIG. 4 is an operation flowchart for dynamically changing an authentication method in an electronic device according to an embodiment of the disclosure.

FIG. 4 is an operation flowchart 400 for dynamically changing an authentication method in an electronic device according to an embodiment of the disclosure.

Referring to FIG. 4, an operation method may include operations 405 to 425. Each step/operation of the operation method of FIG. 4 may be performed by at least one processor (e.g., at least one of the processor 120 of FIG. 1 and the processor 320 of FIG. 3) of an electronic device (e.g., the electronic device 101 of FIG. 1, the electronic device 201 of FIG. 2, or the electronic device 301 of FIG. 3). In an embodiment of the disclosure, at least one of operations 405 to 425 may be omitted, the order of some operations may be changed, or another operation may be added.

Hereinafter, when a payment application is executed in the electronic device 301, a case in which a payment-related function is controlled by an authentication method corresponding to a country of residence will be described.

Referring to FIG. 4, in operation 405, information on a first country in which the electronic device 301 is located may be confirmed. According to an embodiment of the disclosure, the electronic device 301 may confirm the location of the electronic device 301 and may identify information on the first country based on the confirmed location. For example, the electronic device 301 may identify a current location using an MNC code or an MCC code or a GPS signal, and may identify information on the first country corresponding to the current location.

In operation 410, the electronic device 301 may identify whether there is a payment application execution request. The electronic device 301 may display an object corresponding to the payment application on the screen, and the payment application may be executed according to a user input. Here, the fact that the payment application is driven may mean that the user is in a state of capable of controlling the payment-related function. In a state in which the payment application is executed, the user may select any one of a plurality of predetermined form of payment in the executed payment application.

In operation 415, when it is determined in operation 410 that a selection of any one form of payment is detected, the electronic device 301 may perform payment based on a first authentication method corresponding to the information on the first country. According to an embodiment of the disclosure, when the first authentication method is a method in which a payment token required for performing payment is issued from an external server at every payment, the electronic device 301 may receive issuance of one-time token through communication with the external server (e.g., the financial server 230 of FIG. 2 {or issuer server}) and may perform payment using the issued one-time token at the time of payment.

Next, in operation 420, the electronic device 301 may determine whether a change from the first country to the second country is detected. According to an embodiment of the disclosure, the electronic device 301 may periodically identify the current location and, for example, may determine whether there is a change in the country of residence using an MNC code, an MCC code, or a GPS signal.

When there is the change in the country of residence, the electronic device 301 may obtain configuration information including at least one security policy to be applied at the time of payment when the country of residence is changed in order to change to an authentication method corresponding to the country of residence. According to an embodiment of the disclosure, the electronic device 301 may obtain the configuration information when the country of residence is changed, and may change to an authentication method corresponding to the changed country based on the configuration information.

Accordingly, in operation 425, when it is determined in operation 420 that a change from the first country to the second country is detected, the electronic device 301 may change the first authentication method to a second authentication method corresponding to information on the second country based on the obtained configuration information.

According to an embodiment of the disclosure, the configuration information may include at least one security policy to be applied at the time of payment.

According to an embodiment of the disclosure, the at least one security policy may include a security policy supported by the electronic device 301 itself, for example, a security policy currently in use before moving to a country, a security policy for each country supporting overseas payment, a security policy for each form of payment (for each card) supporting overseas payment, a security policy according to a payment method (e.g., MST, NFC, QR, or barcode), and a security policy according to a payment amount.

Accordingly, when the user executes a payment application in the second country, the changed second authentication method may be applied. In another embodiment of the disclosure, the changed second authentication method may be applied when the user changes a payment method to be used abroad in advance through menu configuration. Here, the time at which the changed second authentication method is applied may not be limited thereto. For example, using a pull method in which the electronic device 301 requests a security policy in a country where the electronic device 301 roams during roaming abroad or a method in which the electronic device 301 periodically inquires whether there is a change in the security policy for each country supporting overseas payment using a timestamp, the configuration information may be obtained.

The electronic device 301 may obtain and store the configuration information including at least one security policy used to determine the above-described authentication method before actual payment is made in the electronic device 301. In addition, the electronic device 301 may update the corresponding configuration information when roaming abroad or by periodically inquiring about the configuration information.

According to an embodiment of the disclosure, a method for supporting mobile payment in an electronic device (e.g., the electronic device 101 of FIG. 1, the electronic device 201 of FIG. 2, or the electronic device 301 of FIG. 3) may include identifying information on a first country in which the electronic device is located, performing payment based on a first authentication method corresponding to information on the identified first country in response to a first payment application execution request, and changing the first authentication method to a second authentication method corresponding to information on a second country in response to detection of a change from the first country to the second country.

According to an embodiment of the disclosure, the first authentication method may be a method in which a payment token required to perform payment is issued from an external server at every payment, and the second authentication method may be a method in which any one of a plurality of pre-stored payment tokens is used.

According to an embodiment of the disclosure, the method may further include obtaining configuration information including at least one security policy to be applied at the time of payment corresponding to the second country, in response to detection of a change from the first country to the second country.

According to an embodiment of the disclosure, the changing to the second authentication method corresponding to the information on the second country may include changing to a second authentication method corresponding to the second country based on the configuration information, in response to a second payment application execution request.

According to an embodiment of the disclosure, the at least one security policy may include at least one of a security policy supported by the electronic device itself, a security policy for each country supporting overseas payment, a security policy for each form of payment supporting overseas payment, a security policy according to a payment method, and a security policy according to a payment amount.

According to an embodiment of the disclosure, the method may further include issuing a device nonce (or random number) for authentication on the plurality of pre-stored payment tokens in response to the second payment application execution request and transmitting the device nonce to a payment server connected to a financial server to perform authentication between the financial server and an authentication server, and completing authentication of the plurality of pre-stored payment tokens by receiving a verification result for the device nonce from the payment server.

According to an embodiment of the disclosure, the transmitting the device nonce may include requesting authentication on biometric information from the authentication server in response to the second payment application execution request, and transmitting the device nonce to the payment server when the authentication on the biometric information by the authentication server is successful.

According to an embodiment of the disclosure, the obtaining the configuration information may include displaying a guidance for payment in the second country in response to detection of a change from the first country to the second country, and obtaining the configuration information in response to reception of a user's selection.

Figure 5:
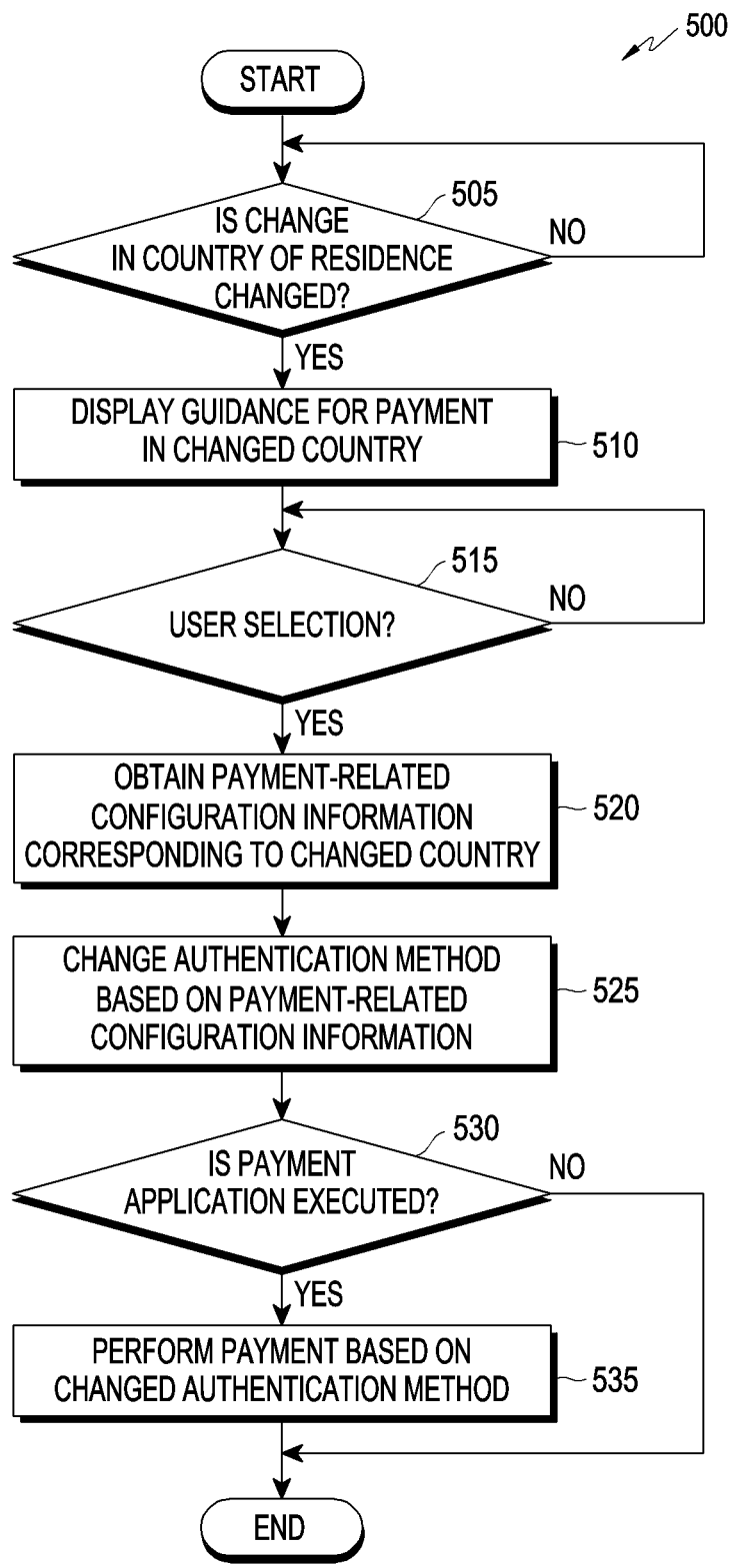
FIG. 5 is an operation flowchart for changing an authentication method when a country of residence is changed according to an embodiment of the disclosure.

FIG. 5 is a flowchart 500 for changing an authentication method when a country of residence is changed according to an embodiment of the disclosure.

Referring to FIG. 5, the method may include operations 505 to 535. Each step/operation of the operation method of FIG. 5 may be performed by at least one processor (e.g., at least one of the processor 120 of FIG. 1 and the processor 320 of FIG. 3) of an electronic device (e.g., the electronic device 101 of FIG. 1, the electronic device 201 of FIG. 2, or the electronic device 301 of FIG. 3). In an embodiment of the disclosure, at least one of operations 505 to 535 may be omitted, the order of some operations may be changed, or another operation may be added.

In operation 505, the electronic device 301 may determine whether a change in a country of residence is detected. In operation 510, when it is determined in operation 505 that a change in a country of residence is detected, the electronic device 301 may display a guidance for payment in the changed country. For example, a guidance screen informing that an overseas payment is required may be displayed. As the guidance screen indicating that overseas payment is required is displayed, the user can know in advance that the payment is overseas before attempting the payment.

In operation 515, the electronic device 301 may determine whether there is a user selection for overseas payment. When it is determined in operation 515 that a user selection for overseas payment is detected, the user selection, in operation 520, the electronic device 301 may obtain payment-related configuration information corresponding to the changed country. For example, configuration information related to overseas payment may be obtained in response to the user selection.

In operation 525, the electronic device 301 may change the authentication method based on the payment-related configuration information. According to an embodiment of the disclosure, the electronic device 301 may change to the authentication method corresponding to the changed country instead of the previous authentication method. For example, the electronic device 301 may change the authentication method from a method in which a payment token required to perform payment is issued from an external server at every payment to a method for using any one of a plurality of pre-stored payment tokens. According to an embodiment of the disclosure, the changed authentication method may be applied when a payment application is actually executed.

In operation 530, the electronic device 301 may determine whether the payment application is executed. When it is determined in operation 530 that the payment application is executed and a payment method is selected by the user, in operation 535, the electronic device 301 may perform payment based on the changed authentication method.

Figure 6:
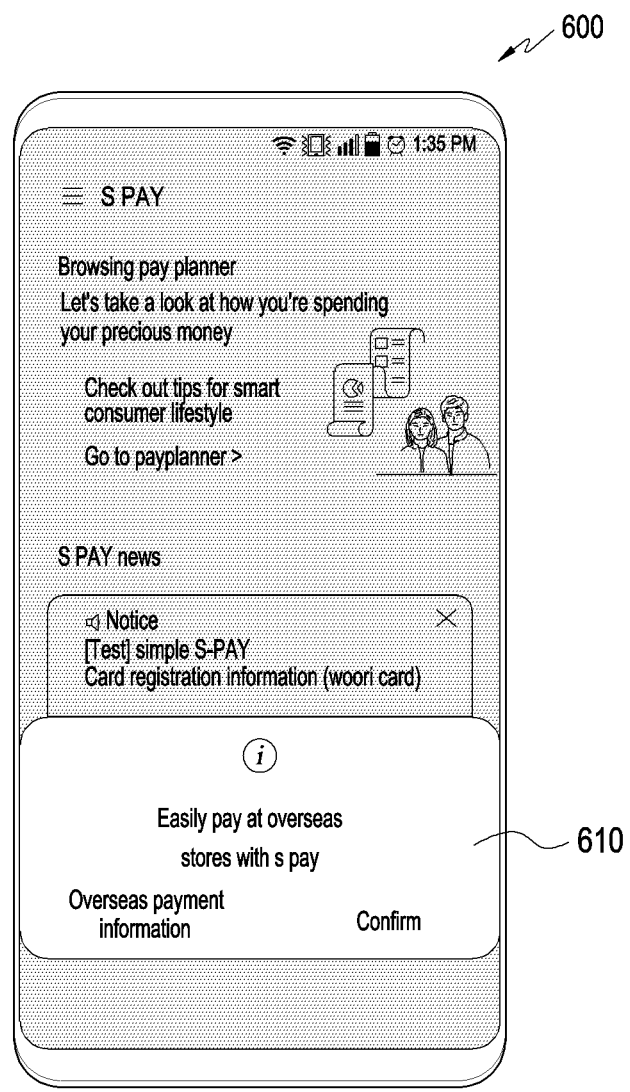
FIG. 6 is a diagram illustrating a guidance screen for payment in a changed country when a country of residence is changed according to an embodiment of the disclosure.

FIG. 6 is a diagram illustrating a guidance screen 600 for payment in a changed country when a country of residence is changed according to an embodiment of the disclosure.

Referring to FIG. 6, when the change in a country of residence is detected, a guidance screen for overseas payment may be displayed. According to an embodiment of the disclosure, information 610 for guiding the user to proceed with overseas payment may be displayed. For example, when the user selects to use overseas payment, configuration information corresponding to the country of residence may be obtained. Accordingly, an image of at least one form of payment (e.g., a credit card) for overseas payment may be displayed based on the configuration information, and when any one form of payment is selected by the user, the authentication method may be applied so that payment using the form of payment is made possible. For example, the electronic device 301 may perform an authentication process for the stored payment token so that the stored payment token can be used for the form of payment selected by the user, and a detailed description thereof will be given later.

Figure 7:
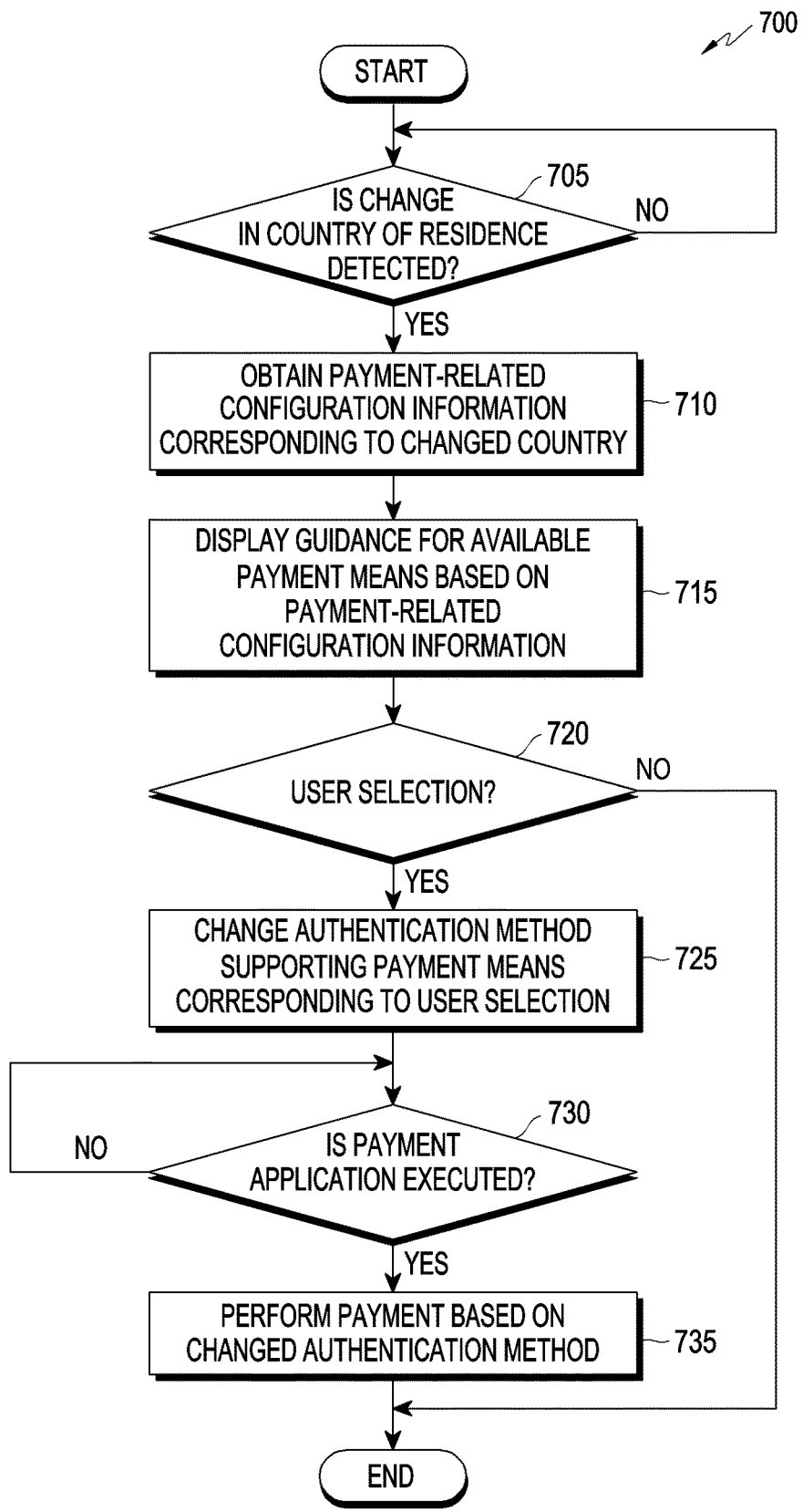
FIG. 7 is an operation flowchart for changing an authentication method in response to a user's selection when a country of residence is changed according to an embodiment of the disclosure.

FIG. 7 is a flowchart 700 for changing an authentication method in response to a user's selection when a country of residence is changed according to an embodiment of the disclosure.

Referring to FIG. 7, in operation 705, the electronic device 301 may determine whether a change in the country of residence is detected. When it is determined in operation 705 that a change in the country of residence is detected, in operation 710, the electronic device 301 may obtain payment-related configuration information corresponding to the changed country. According to an embodiment of the disclosure, unlike in FIG. 5, FIG. 7 illustrates a case in which payment-related configuration information corresponding to the changed country is obtained in response to detection of a change in the country of residence.

Accordingly, in operation 715, the electronic device 301 may display a guidance for an available form of payment based on the payment-related configuration information. For example, since the configuration information has already been obtained, a guidance for a form of payment available in the current location, that is, the country in which the user is currently staying, may be displayed.

Figure 8A:
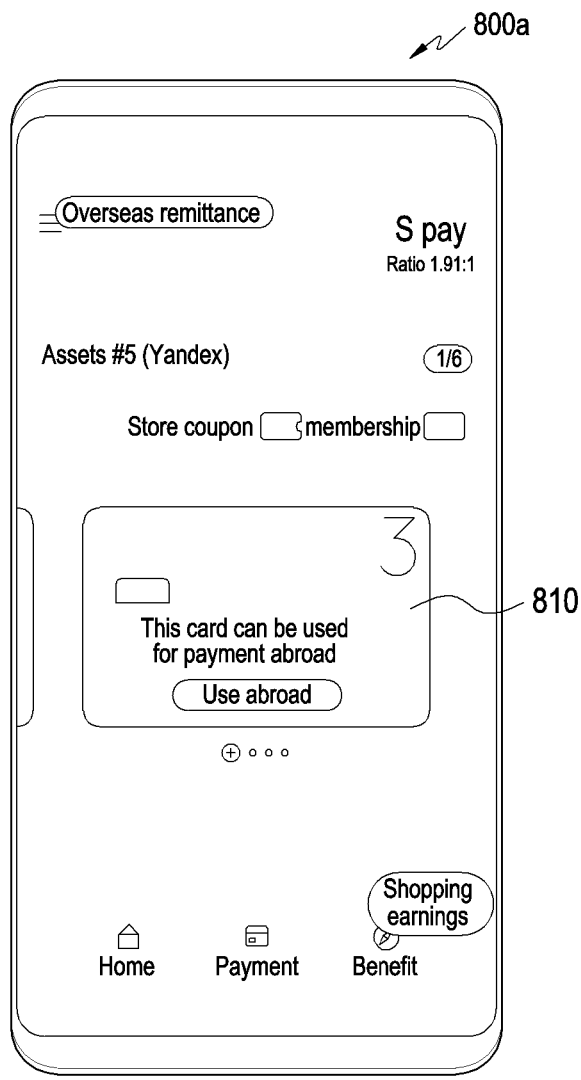
FIGS. 8A and 8B are diagrams illustrating a guidance screen for a payment method that can be used when a country of residence is changed according to various embodiments of the disclosure.
Figure 8B:
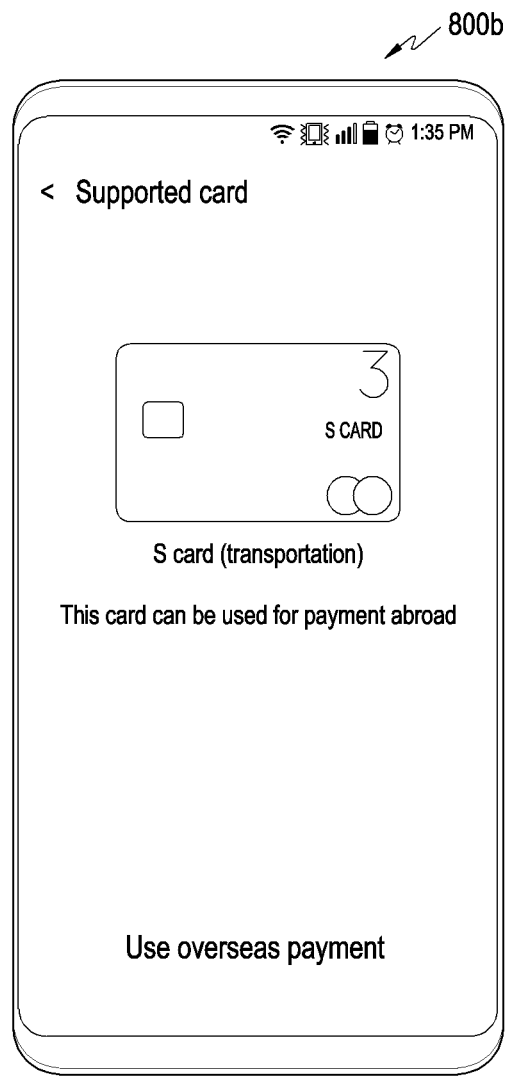

In order to describe this, FIGS. 8A and 8B may be referred to.

FIGS. 8A and 8B are diagrams illustrating guidance screens 800a and 800b for a payment method that can be used when a country of residence is changed according to various embodiments of the disclosure.

Referring to FIG. 8A, the electronic device 301 may display a guidance 810 for an available form of payment based on payment-related configuration information while a payment application is executed. Referring to FIG. 8A, the electronic device 301 may display at least one form of payment available for overseas payment. In this case, when there are a plurality of predetermined form of payment, only the form of payment capable of overseas payment may be displayed in an activated state.

In operation 720, the electronic device 301 may determine whether there is a user selection for allowing overseas payment. When it is determined in operation 720 that there is a user selection for allowing overseas payment, in operation 725, the electronic device 301 may change to an authentication method supporting the form of payment corresponding to the user selection. In this case, the user selection corresponds to an input for confirming the form of payment based on configuration information according to a change in the country of residence, and may not correspond to an actual payment. Therefore, the changed authentication method may be applied when an actual payment request is made.

To this end, in operation 730, the electronic device 301 may determine whether a payment application is executed. Referring to FIG. 8B, when any one form of payment is selected by the user, the electronic device 301 may display the selected form of payment, and may further display content requesting an input of biometric information for payment using the form of payment. Accordingly, when it is determined in operation 730 that a payment application is executed, in operation 735, the electronic device 301 may perform payment based on the changed authentication method.

Meanwhile, according to an embodiment of the disclosure, the authentication method available for payment in the electronic device may include a local authentication method, a TA-based authentication method, or a FIDO service authentication method, and different authentication methods may be applied for each country. For example, payment based on the FIDO service authentication method may be performed in a first country (e.g., Korea), but a TA-based authentication method may be used in a second country (e.g., Europe or the United States). Since the authentication method applied to each country is different, the authentication method to be applied when the country of residence is changed may also be different. Therefore, each authentication method will be described below with reference to FIGS. 9 to 12.

Figure 9:
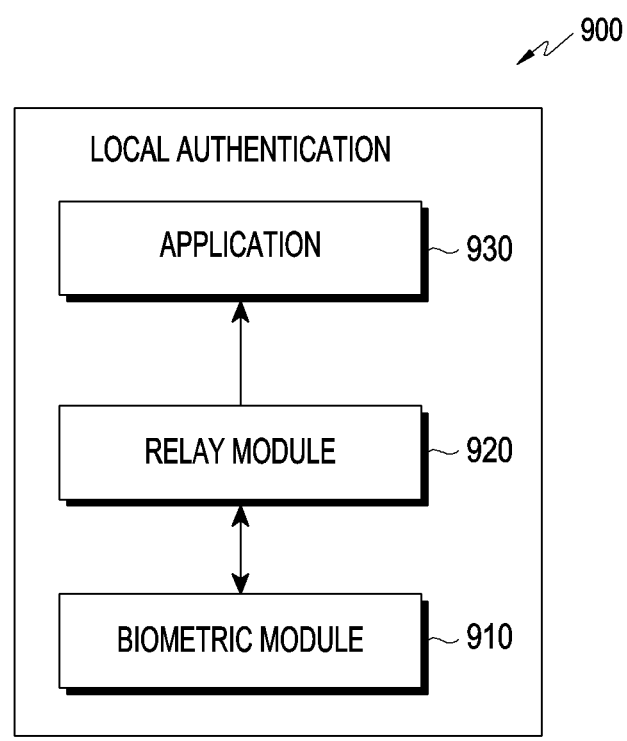
FIG. 9 is a diagram illustrating a local authentication method according to an embodiment of the disclosure.

FIG. 9 is a diagram 900 illustrating a local authentication method according to an embodiment of the disclosure.

Referring to FIG. 9, in the case of local authentication, biometric authentication may be performed by the electronic device. As to the local authentication, when biometric information, such as fingerprint and iris received through the biometric module 910 is transmitted to an application (e.g., payment application) 930 through a relay module (e.g., Android F/W) 920, the application 930 may compare stored biometric information with biometric information input through the biometric module 910, and may perform payment using the success or failure of the authentication result for the input biometric information. As described above, the local authentication may be a biometric authentication method through communication between the biometric module 910 and the application 930.

Figure 10:
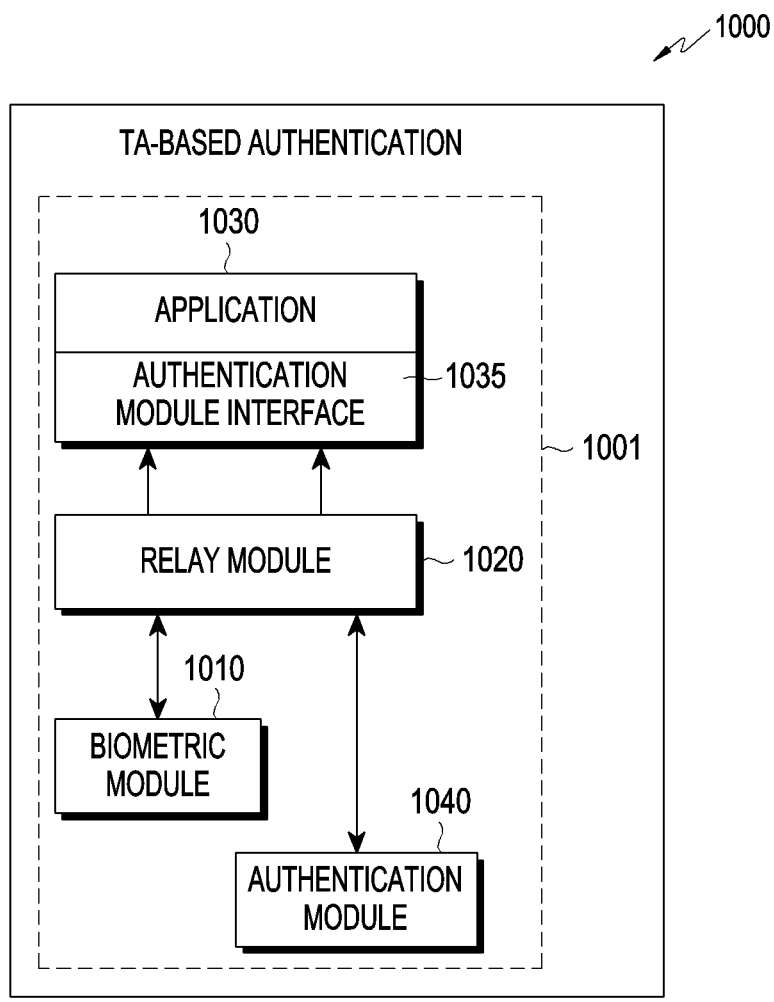
FIG. 10 is a diagram illustrating a trusted application (TA)-based authentication method according to an embodiment of the disclosure.

FIG. 10 is a diagram 1000 illustrating a TA-based authentication method according to an embodiment of the disclosure.

Referring to FIG. 10, as a method of improved security compared to the local authentication method, TA may mean an application executed in a trusted execution environment (TEE). In the case of TA authentication, data that requires a relatively high security level may be stored in a security area, and biometric information obtained through a biometric module 1010 may be authenticated using an application capable of performing a function, such as security, payment, or biometric authentication in the TEE.

Specifically, for the biometric information input through the biometric module 1010, the relay module 1020 may transmit the biometric information to an application (e.g., a payment application) 1030, and an authentication module (e.g., Auth TA) 1040 may provide information (e.g., a nonce) for authentication of biometric information to an authentication module interface 1035 through the relay module 1020. Here, the nonce is for authentication of biometric information, and may be generated (or issued) during authentication of biometric information.

When the authentication module 1040 wraps the issued nonce for authentication of biometric information, for example, signs the issued nonce and transmits the nonce to the application 1030, the application 1030 may verify the wrapped nonce. When it is determined as a result of the verification that the nonce issued by the TA is wrapped, it can be determined that the authentication is successful. Accordingly, authentication of biometric information input for payment may be completed. In this way, by utilizing the TA that issues and verifies a separate nonce, the verification result using the nonce can be obtained when the electronic device performs internal authentication, so that the TA-based authentication method 1001 may be an authentication method with enhanced security compared to the local authentication method.

Hereinafter, a TA-based authentication method 1001 for security enhancement will be described below with reference to FIG. 11.

Figure 11:
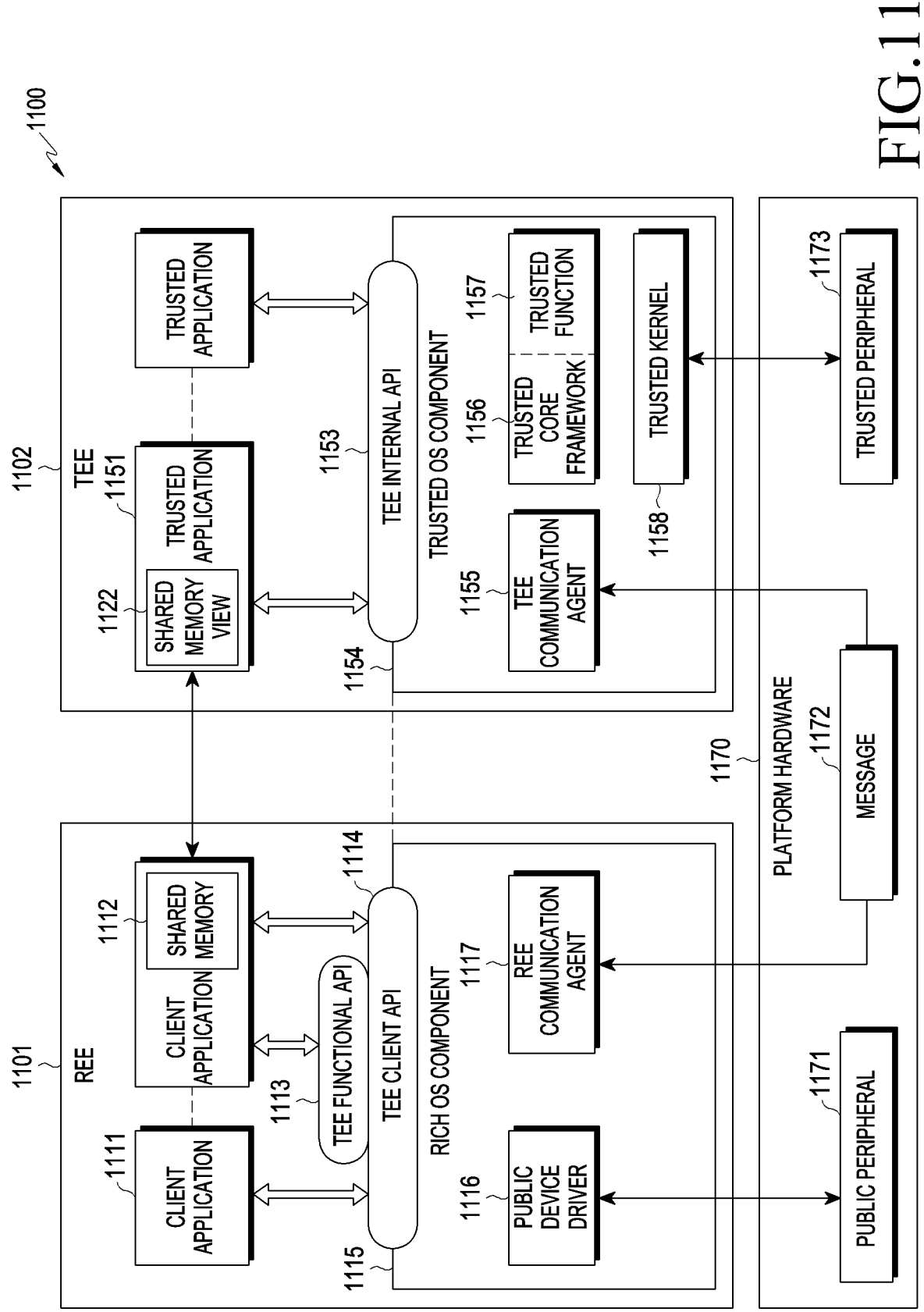
FIG. 11 is a block diagram illustrating a general execution environment and a secure execution environment operated in an electronic device according to an embodiment of the disclosure.

FIG. 11 is a block diagram 1100 illustrating a general execution environment and a secure execution environment operated in an electronic device (the electronic device 101 of FIG. 1, the electronic device 201 of FIG. 2, or the electronic device 301 of FIG. 3) according to an embodiment of the disclosure.

Referring to FIG. 11, according to an embodiment of the disclosure, the electronic device may operate an execution environment having a plurality of security levels to enhance security. The plurality of execution environments may include, for example, a rich execution environment (REE) 1101 and a trusted execution environment (TEE) 1102.

The REE 1101 may be, for example, a first execution environment having a first security level. The TEE 1102 may be, for example, a second execution environment having a second security level that is different from (e.g., higher than) the first security level.

The REE 1101 may include, for example, a client application 1111, a shared memory 1112, a TEE functional application programming interface (API) 1113, a TEE client API 1114, a rich OS component 1115, public device drivers 1116, or an REE communication agent 1117. The client application 1111 may include one or more applications capable of performing functions, such as a phone call, a message, a payment, an alarm, a browser, or a camera. The client application 1111 may include a shared memory 1112, and may use the shared memory 1112 to access a shared memory view 1122 of the TEE 1102. The shared memory 1112 may be a memory accessible by applications of the REE 1101 and the TEE 1102.

The TEE functional API 1113 and/or the TEE client API 1114 may be an API allowed to access the TEE 1102. The TEE functional API 1113 may be an application interface designed to allow access to some services of the TEE 1102. The TEE client API 1114 may be an interface designed to exchange data between the REE 1101 and an application of the TEE 1102. The rich OS component 1115 may include, for example, the public device drivers 1116 or the REE communication agent 1117. The public device driver 1116 may be a system driver for driving public peripherals 1171 in the REE 1101. The REE communication agent 1117 may serve to process message communication between the client application 1111 and the trusted application 1151. The client application 1111 may transmit a message 1172 from the REE communication agent 1117 to the TEE communication agent 1155 of the TEE 1102 using the TEE functional API 1113 and/or the TEE client API 1114. The message 1172 may be implemented to be transmitted only to the TEE 1102, for example, in hardware. The REE communication agent 1117 may receive, for example, a processing result related to the message 1172 from the TEE communication agent 1155 and may transmit the received result to the client application 1111.

The TEE 1102 may include a trusted application 1151, a shared memory view 1122, a TEE internal API 1153, a trusted OS component 1154, a TEE communication agent 1155, a trusted core framework 1156, a trusted function 1157, or a trusted kernel 1158. The trusted OS component 1154 may include a TEE communication agent 1155, the trust core framework 1156, the trusted function 1157, and/or a trusted kernel 1158. A platform hardware 1170 is, for example, a hardware component that transmits the message 1172 from the REE communication agent 1117 to the TEE communication agent 1155. The platform hardware 1170 may include the public peripherals 1171 and/or trusted peripherals 1173. In addition, the trusted peripherals 1173 are security (or cryptographic)-related peripherals connected to the TEE 1102, and may be, for example, a fingerprint sensor, an iris sensor, or a security display.

The trusted application 1151 may include one or more applications that may perform functions, such as digital rights management (DRM), security, payment, or biometric authentication. The shared memory view 1122 may be a memory space accessible to the shared memory 1112 of the REE 1101.

The TEE 1102 may store data requiring a relatively high security level in a safe environment and may perform related operations. The TEE 1102 may operate on an application processor of an electronic device (e.g., the electronic device 301 of FIG. 3), and may operate based on a reliable hardware structure determined during a manufacturing process of the electronic device. The TEE 1102 may divide the application processor or the memory into a general area and a security area to operate in the security area. The TEE 1102 may distinguish and operate an operating system for security. In this case, data used in the TEE 1102 may be encrypted and stored in a general memory so that the data can be decrypted only by the operating system for security. The TEE 1102 may configure to allow software or hardware requiring security to be operated only in the security area. The electronic device may operate a secure execution environment through a physical change of hardware or a logical change of software. The TEE 1102 may be referred to as an embedded secure element (eSE), a secure element, or a trust zone.

The TEE 1102 may be separated from each other and hardware restrictions from the REE 1101, and may operate separately in software on the same hardware. At least one application (e.g., payment, contact, email, or browser) operating in the REE 1101 may use an API (e.g., TEE functional API or TEE client API) that is allowed to access the TEE 1102. The at least one application may transmit a message from a communication agent (REE communication agent) in a general execution environment to a communication agent (TEE communication agent) in a secure execution environment by using the API. The message may be implemented to be transmitted only to the TEE 1102 in hardware. The communication agent in the secure execution environment may receive the message and transmit the received message to a trusted application (TA) (e.g., a DRM, a secure payment module, a secure biometric information module, or the like) related to the message. The security application may perform an operation related to the message, and may transmit a result of the operation to the communication agent in the general execution environment through the communication agent in the secure execution environment. The communication agent of the general execution environment may transmit the result to at least one application operating in the general execution environment.

Figure 12:
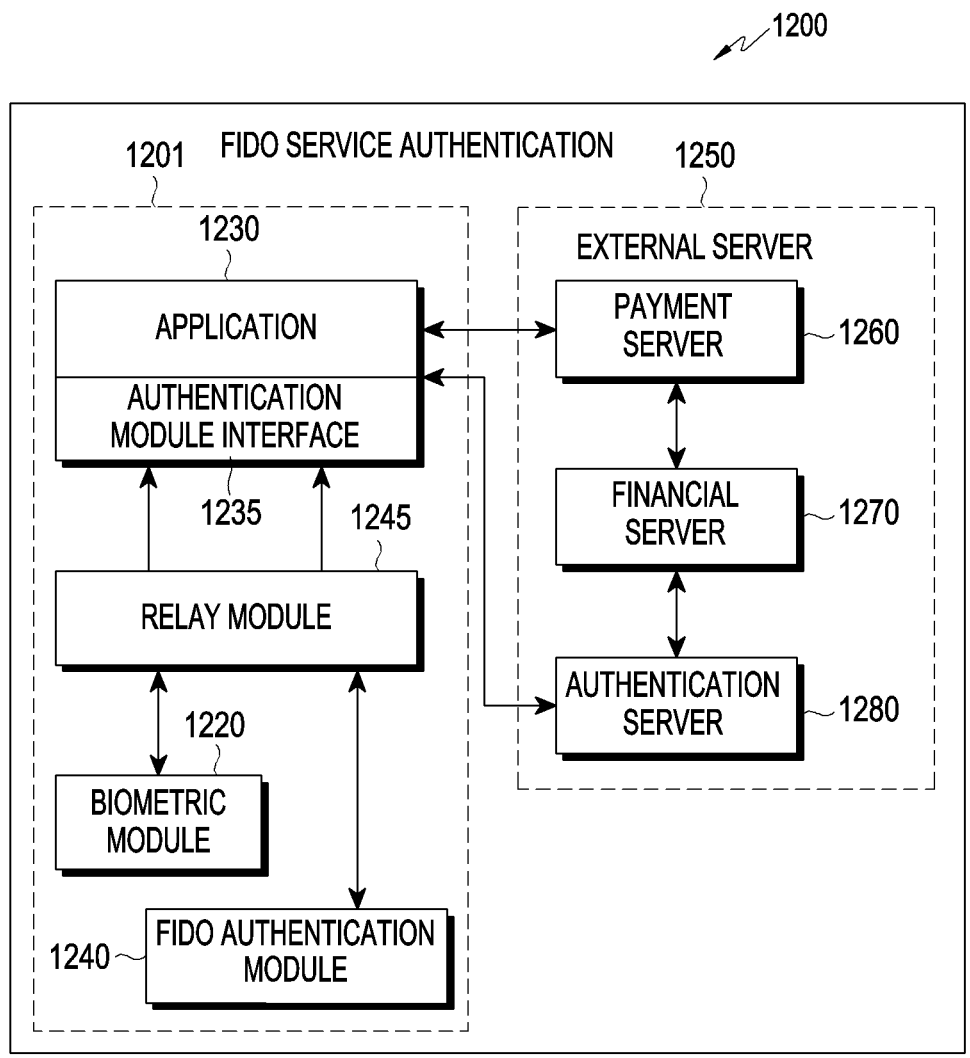
FIG. 12 is a diagram illustrating a fast identity online (FIDO) service authentication method according to an embodiment of the disclosure.

FIG. 12 is a diagram 1200 illustrating a FIDO service authentication method according to an embodiment of the disclosure.

Referring to FIG. 12, it illustrates an authentication method through interworking with an authentication server (e.g., a FIDO server 1280). A token issuance operation in FIG. 12 is based on a first country (e.g., Korea), and the token issuance operation may vary according to each country. For example, in the first country (e.g., Korea), payment may be performed using an authentication method in which a one-time token is issued for each payment, but in a second country (e.g., the United States), an authentication method using a pre-stored token may be used to perform payment.

For the token issuance operation based on the FIDO service authentication of FIG. 12, the electronic device 1201 and the external server 1250 may include, for example, at least one of a payment server 1260, a financial server 1270, and an authentication server 1280. The electronic device 1201 may include, for example, at least one of a biometric module 1220, a FIDO authentication module 1240, a relay module 1245, an authentication module interface 1235, and an application (e.g., a payment application) 1230.

According to an embodiment of the disclosure, the electronic device 1201 may obtain user biometric information, such as a fingerprint and an iris through the biometric module 1220. The biometric information obtained by the relay module 1245 may be digitally signed and transmitted to the application 1230. For example, the relay module 1245 may be Android F/W. The FIDO authentication module 1240 may sign a nonce issued from the authentication server 1280 after successful biometric authentication. In response to this, when the application 1230 transmits the signed nonce to the authentication server 1280 through the payment server 1260, the authentication server 1280 may issue an authentication token by verifying the signed nonce. The authentication server 1280 may serve to issue a public key and verify a signature, and may serve to issue a nonce indicating a biometric verification original value for biometric authentication.

For example, the application 1230 may request a nonce issuance request for biometric authentication from the authentication server 1280, from the payment server 1260 when payment is executed, and a one-time token (OTT) may be issued from the financial server 1270 connected to the payment server 1260. The authentication server 1280 may verify the signed nonce, may issue a one-time token, and may provide a service after reconfirming the token issued between the financial server 1270 and the authentication server 1280. Accordingly, the electronic device 1201 may use the issued one-time token for payment with a payment device, for example, a POS.

Figure 13A:
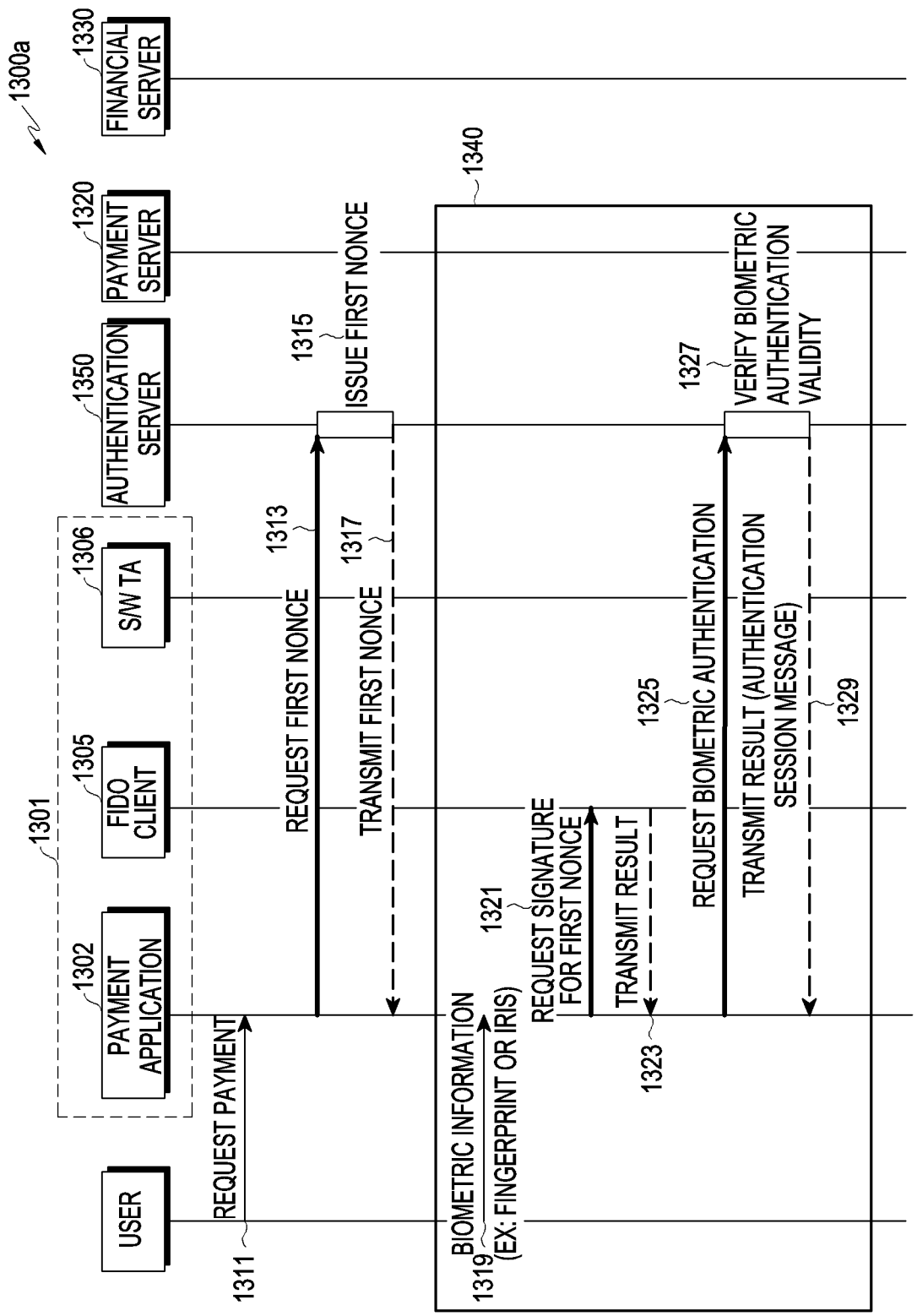
FIGS. 13A and 13B are flowcharts illustrating a payment process by biometric authentication according to various embodiments of the disclosure.
Figure 13B:
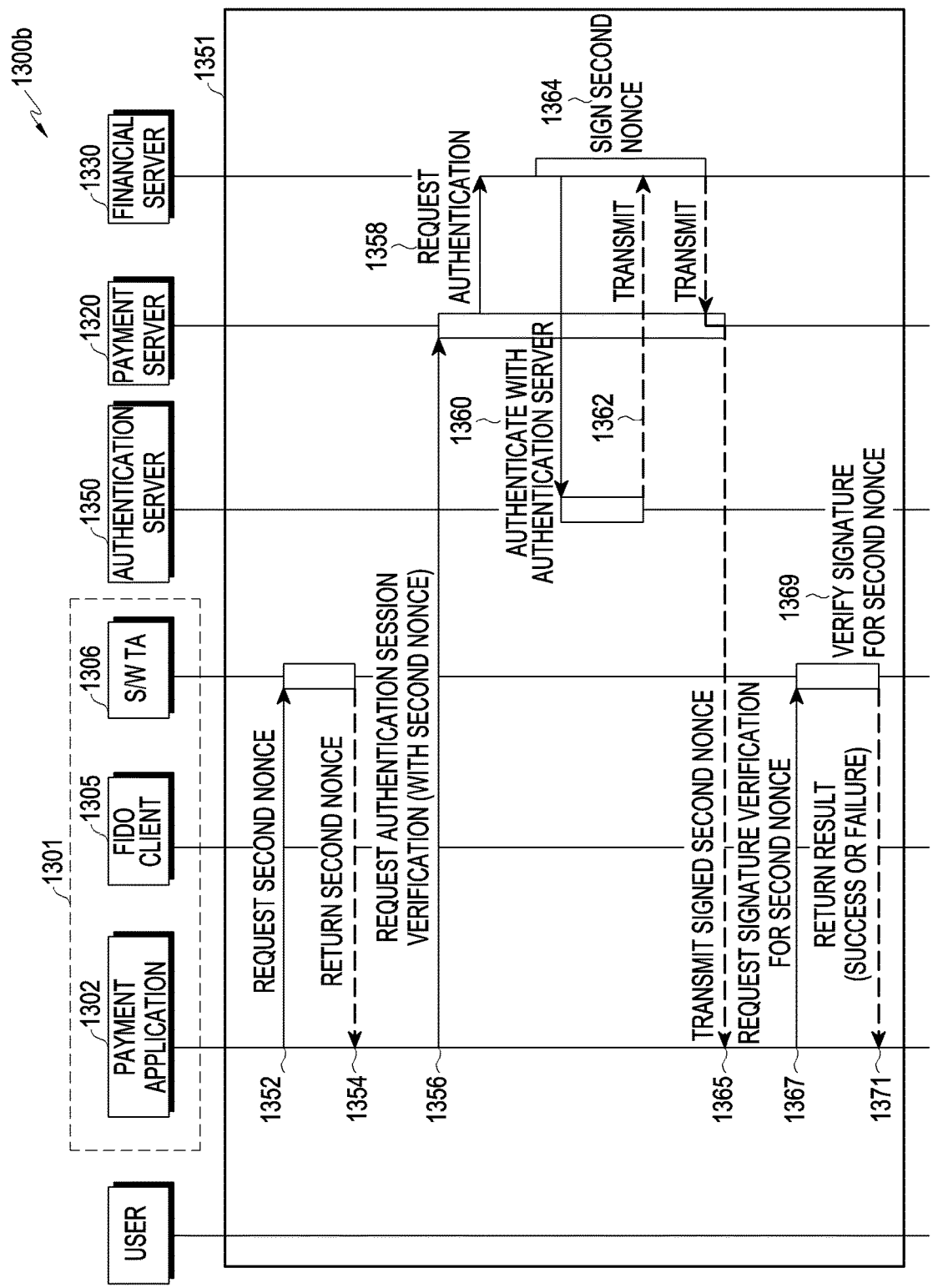

FIGS. 13A and 13B are flowcharts 1300a and 1300b illustrating a payment process by biometric authentication according to various embodiments of the disclosure.

According to an embodiment of the disclosure, in FIGS. 13A and 13B, a solid line may indicate a request (e.g., or call) command, and a dotted line may include a response (e.g., or return) command.

Referring to FIG. 13A, an electronic device 1301 (e.g., the processor 320) may start a payment operation using a payment application. Referring to FIG. 13A, each component of the electronic device 1301 is illustrated to perform an operation related to payment for biometric authentication in a payment application 1302, a FIDO client 1305, and an S/W TA application 1306, but may be performed by at least one processor (e.g., the processor 320).

According to an embodiment of the disclosure, the payment application 1302 may provide a user interface (UI) related to card registration, payment, or transaction. In addition, the payment application may provide an interface related to user authentication through, for example, identification and verification (ID&V).

According to an embodiment of the disclosure, after the payment application 1302 is executed, in operation 1311, the electronic device 1301 may receive a payment request by the user through the user interface provided by the payment application 1302. According to an embodiment of the disclosure, the electronic device 1301 (e.g., the payment application 1302) may determine whether overseas payment is required according to a change in the country of residence in response to an input of the payment request.

According to an embodiment of the disclosure, when a change in the country of residence is detected based on location information or network operator information, the electronic device 1301 (e.g., the payment application 1302) may obtain configuration information including at least one security policy to be applied at the time of payment. According to an embodiment of the disclosure, the electronic device 1301 (e.g., the payment application 1302) may obtain the configuration information when the country of residence is changed, and may change to an authentication method corresponding to the changed country based on the configuration information. Accordingly, according to the configuration information including the at least one policy, the authentication method may be dynamically changed, and the above-described configuration information may be obtained automatically or by a user selection when the change in the country of residence is detected. According to an embodiment of the disclosure, the configuration information may be stored in a memory (e.g., the memory 330) when the payment application is installed or updated in the electronic device 1301. Alternatively, the configuration information may be updated and stored when an overseas payment function is added through a menu by the user by executing the payment application 1302 after the country of residence is changed.

According to an embodiment of the disclosure, the configuration information may include at least one security policy to be applied at the time of payment. According to an embodiment of the disclosure, the at least one security policy may include a security policy currently applied by the electronic device 1301 itself, a security policy for each country supporting overseas payment, a security for each form of payment (e.g., for each card) supporting overseas payment, a security policy according to a payment method (e.g., MST, NFC, QR, or barcode), and a security policy according to a payment amount.

For example, according to the security policy for each country supporting overseas payment, a first country (e.g., Korea) may require authentication of the user to use a one-time token method, and a second country (e.g., the United States) may require authentication of the user to use a stored token.

When it is determined that overseas payment is necessary in response to a payment request, the electronic device 1301 (e.g., the payment application 1302) may request issuance of a first nonce for authenticating a token stored in advance in the memory of the electronic device 1301 from an authentication server 1350. For example, the first nonce may be an original biometric verification value issued by the authentication server 1350.

According to an embodiment of the disclosure, in operation 1313, in response to the input of the payment request, the electronic device 1301 (e.g., the payment application 1302) may request the first nonce from the authentication server (e.g., the FIDO server) 1350. According to an embodiment of the disclosure, the request for the first nonce may use a message "AuthentificationRequest" defined in a FIDO protocol specification.

The authentication server 1350 may issue the first nonce in response to the first nonce request in operation 1315, and may transmit the first nonce to the payment application 1302 of the electronic device 1301 in operation 1317. Here, the first nonce may be generated for verification of biometric authentication in the electronic device 1301.

According to an embodiment of the disclosure, when biometric information, such as a fingerprint or iris is input from the user in operation 1319 through the user interface provided by the payment application 1302, the electronic device 1301 may perform biometric authentication. According to an embodiment of the disclosure, the user authentication using biometric information may conform to the FIDO standard, and accordingly, authentication of biometric information may be performed by the FIDO client 1305 in the electronic device 1301.

Figure 14:
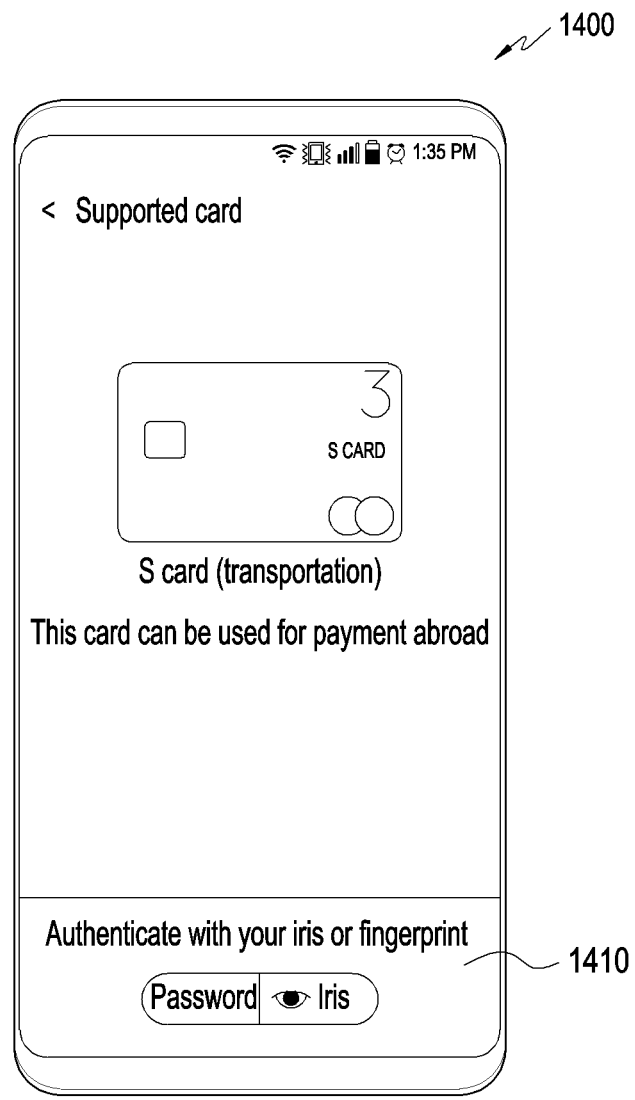
FIG. 14 is a diagram illustrating a screen for inputting biometric information according to an embodiment of the disclosure.

According to an embodiment of the disclosure, as shown in FIG. 14, the electronic device 1301 may display a screen including a phrase 1410 for guiding the user to input biometric information, such as an iris or fingerprint while the payment application 1302 is executed.

FIG. 14 is a diagram 1400 illustrating a screen for inputting biometric information according to an embodiment of the disclosure.

Referring to FIG. 14, the electronic device 1301 may request authentication from the user for payment of a card that can be paid abroad, and may request a user input of biometric information for this purpose. For example, when the payment application 1302 is executed, the payment application 1302 of the electronic device 1301 may guide a form of payment (e.g., a card) that can be used abroad among predetermined form of payment (e.g., a plurality of cards). In addition, when any one form of payment (e.g., a card) is selected through a user input, user biometric information may be used for payment of the selected form of payment (e.g., a card).

In response to the input of the biometric information, the payment application 1302 of the electronic device 1301 may request a signature for a first nonce from the FIDO client 1305 for biometric authentication verification in operation 1321. In response to the signature request for the first nonce, the payment application 1302 may receive a result that is the first nonce signed by the FIDO client 1305 in operation 1323. According to an embodiment of the disclosure, the FIDO client 1305 may sign the first nonce using a pre-issued digital key. According to an embodiment of the disclosure, the FIDO client 1305 may encrypt the biometric information input from the user and the first nonce using an encryption key in the TEE and may transmit the encrypted information to the payment application 1302.

In operation 1325, the payment application 1302 may transmit a biometric authentication request including the signed first nonce to the authentication server 1350. As described above, for biometric authentication, the electronic device 1301 may transmit the signed first nonce to the authentication server 1350. According to an embodiment of the disclosure, the biometric authentication request may use a message "AuthentificationResponse" defined in the FIDO standard specification.

According to an embodiment of the disclosure, the authentication server 1350 may verify the validity of the biometric authentication in operation 1327. For example, the authentication server 1350 may verify the signed first nonce included in the biometric authentication request to determine whether the first nonce issued by the authentication server 1350 is correct. For example, it is possible to verify whether the signature for the first nonce for biometric authentication is normal.

When the signature is normal according to the verification result of biometric authentication validation, the authentication server 1350 may transmit the result to the electronic device 1301 in operation 1329. According to an embodiment of the disclosure, as a result of biometric authentication validation, an authentication session message may be transmitted.

According to an embodiment of the disclosure, operation 1340 in FIG. 13A shows an example of a biometric authentication process using biometric information. An authentication session for biometric authentication may be completed through the above operations, and after the authentication session is completed, as in operation 1351 of FIG. 13B, an authentication process for a token stored in the electronic device 1301 for overseas payment may be performed.

Referring to FIG. 13B, operation 1351 of FIG. 13B shows an example of the authentication process for the stored payment token.

According to an embodiment of the disclosure, the payment application 1302 of the electronic device 1301 may request a second nonce to acquire the stored payment token from the memory in operation 1352. According to an embodiment of the disclosure, the second nonce may be issued to authenticate the payment token in the electronic device 1301, and the second nonce may be issued by a S/W trusted application (TA) 1306 in the electronic device 1301. According to an embodiment of the disclosure, the stored payment token should be actually retrieved from the memory and authenticated before being used, but the stored payment token may be stored after authentication even when it is issued from an external server (e.g., a financial server 1330) and stored in the memory.

According to an embodiment of the disclosure, in response to a request from the payment application 1302, the S/W TA 1306 may generate a second nonce that is a random variable. Here, the second nonce is used to verify the stored payment token, and may be newly generated whenever any one of the stored payment tokens is used. When the second nonce is generated by the electronic device 1301 as described above, the second nonce generated by the electronic device 1301 may be transmitted to the external server, so that the external server can verity the stored payment token based on the second nonce generated by the electronic device 1301.

According to an embodiment of the disclosure, when the second nonce issued by the S/W TA 1306 is transmitted in operation 1354, the payment application 1302 of the electronic device 1301 may transmit an authentication session verification request to a payment server 1320 in operation 1356. According to an embodiment of the disclosure, the authentication session verification request also requests a signature for the second nonce, and may include the second nonce. According to an embodiment of the disclosure, the authentication session verification request requests authentication for overseas payment, and may be transmitted to the payment server 1320 in a state in which an authentication session message, which is a result of biometric authentication validation, is included. For example, the authentication session verification request serves to transmit an FIDO authentication session issued by the authentication server 1350 to the financial server 1330 through the payment server 1302 for overseas payment, and the FIDO authentication session can be used for verification between the authentication server 1350 and the financial server 1330.

In this way, the FIDO authentication session and the second nonce may be transmitted to the financial server 1330 interworking with the payment server 1320 through the payment server 1320 in order to inform overseas payment.

According to an embodiment of the disclosure, in response to receiving the authentication session verification request, when the payment server 1320 requests authentication from the financial server 1330 in operation 1358, the financial server 1330 may proceed authentication with the authentication server 1350 in operation 1360 in response to the authentication request from the payment server 1320. When authentication between the financial server 1330 and the authentication server 1350 is successful, the authentication result may be transmitted to the financial server 1330 in operation 1362. In operation 1364, the financial server 1330 may sign the second nonce based on the authentication result and may transmit the signed second nonce to the payment application 1302 of the electronic device 1301 through the payment server 1320 in operation 1365. According to an embodiment of the disclosure, the digital signature for the second nonce may be performed by the payment server 1320.

According to an embodiment of the disclosure, in operation 1358, the payment server 1320 may transmit an authentication session message included in the authentication session verification request to the financial server 1330 to request authentication from the financial server 1330. In response to this, the financial server 1330 may instruct to check the FIDO session for authentication with the authentication server 1350. For example, the authentication server 1350 may determine whether the authentication session message is a FIDO session issued by itself. Accordingly, the authentication server 1350 may verify whether the authentication session transmitted from the financial server 1330 is, for example, a session issued by itself when validating the biometric authentication in operation 1327 of FIG. 13A.

As described above, the electronic device 1301 may request, from the authentication server 1350, verification of the FIDO authentication session issued by the authentication server 1350 through operations 1356 to 1364 to authenticate the stored payment token, thereby performing authentication on the stored payment token.

According to an embodiment of the disclosure, when the payment application 1302 of the electronic device 1301 receives the signed second nonce as an authentication result for using the stored payment token, the electronic device 1301 may request verification of the signature for the second nonce signed in operation 1367 from the S/W TA 1306. According to an embodiment of the disclosure, the S/W TA 1306 may verify the signature for the second nonce in operation 1369. Next, in operation 1371, the S/W TA 1306 may return a result of signature verification for the second nonce. For example, the signature verification result for the second nonce may include verification success or verification failure.

According to an embodiment of the disclosure, when the verification by the authentication server 1350 for the second nonce issued inside the electronic device 1301 is successful, the payment application 1302 of the electronic device 1301 may retrieve the pre-stored payment token from the memory to use the pre-stored payment token at the time of payment. For example, there may be a predetermined number of pre-stored tokens or more for overseas payment in the electronic device 1301. For example, the number of times of the valid use of the at least one pre-stored token may be more than once, and may be repeatedly used according to the validity period. As described above, according to an embodiment of the disclosure, the external server does not simply notify success or failure of the FIDO authentication session, but through a signature and signature verification operation for a nonce directly issued inside the electronic device 1301 to authenticate a token stored in the electronic device 1301, there is an advantage of increasing the security level.

According to an embodiment of the disclosure, the electronic device 1301 (e.g., the payment application 1302) may transmit a stored token on which authentication has been completed to a payment device (e.g., a POS device) using various transmission methods. For example, payment-related information including the stored token on which authentication has been completed may be transmitted to the payment device (e.g., the POS device) using a transmission method, such as MST or NFC when payment is performed, and payment may be authorized to complete the payment. Accordingly, in Korea, the electronic device 1301 may receive a one-time token, for example, OTT for every payment and may use an authentication method for using the issued one-time token for payment. In other words, a payment token required to perform payment at every payment may be received from an external server to perform payment. However, when the country of residence is changed, there may be no OTT to be issued in overseas payment. Accordingly, by returning a digitally signed device nonce, that is, the second nonce, the second nonce can be verified by the S/W TA 1306 of the electronic device 1301, and payment may be performed using a changed authentication method, that is, an authentication method for using any one payment token among a plurality of pre-stored payment tokens.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

In connection with a storage medium storing instructions, the instructions may be configured to cause at least one processor to perform at least one operation when the instructions are executed by the at least one processor, and the at least one operation may include identifying information on a first country in which the electronic device is located, performing payment based on a first authentication method corresponding to information on the identified first country in response to a first payment application execution request, and changing the first authentication method to a second authentication method corresponding to information on a second country in response to detection of a change from the first country to the second country.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A portable electronic device comprising:
communication circuitry;
a display;
at least one processor; and
memory configured to be operatively coupled to the at least one processor and storing a payment application,
wherein the memory storing instructions configured to, when executed by the at least one processor, cause the portable electronic device to:
identify that a country in which the portable electronic device is located is changed through the communication circuitry,
if the country in which the portable electronic device is located is changed from a first country to a second country, display information on an available form of payment for the second country through the display,
display a guidance for the available form of payment in the second country based on payment-related configuration information while the payment application is executed,
select a form of payment by a user input,
in response to the selection, change a first authentication method for the first country to a second authentication method for the second country, and
perform, using the payment application stored in the memory, payment using one of a plurality of tokens pre-stored in the memory based on the second authentication method with the selected form,
wherein the first authentication method is associated with information on the first country that includes a one-time payment token,
wherein the second authentication method is associated with information on the second country that includes using the plurality of tokens, and
wherein the guidance includes information that an overseas payment is required.

2. The portable electronic device of claim 1,
wherein the first authentication method is a method in which a payment token required to perform payment is issued from an external server at every payment, and
wherein the second authentication method is a method in which any one of a plurality of pre-stored payment tokens is used.

3. The portable electronic device of claim 1, wherein the instructions are further configured to cause the portable electronic device to:
obtain configuration information including at least one security policy to be applied at a time of payment corresponding to the second country, and
change to the second authentication method based on the configuration information.

4. The portable electronic device of claim 3, wherein the at least one security policy includes at least one of a security policy supported by the portable electronic device itself, a security policy for each country supporting overseas payment, a security policy for each form of payment supporting overseas payment, a security policy according to a payment method, or a security policy according to a payment amount.

5. The portable electronic device of claim 2, wherein the instructions are further configured to cause the portable electronic device to:
issue a device nonce for authentication on the plurality of pre-stored payment tokens according to a request to execute the payment application and transmit the device nonce to a payment server connected to a financial server to perform authentication between the financial server and an authentication server, and
complete authentication of the plurality of pre-stored payment tokens by receiving a verification result for the device nonce from the payment server.

6. The portable electronic device of claim 5, wherein the instructions are further configured to cause the portable electronic device to:
request authentication on biometric information from the authentication server according to the request to execute the payment application, and
transmit the device nonce to the payment server when the authentication on the biometric information by the authentication server is successful.

7. The portable electronic device of claim 1, wherein the instructions are further configured to cause the portable electronic device to:
obtain configuration information including at least one security policy to be applied at a time of payment corresponding to the second country in response to reception of a user's selection after displaying the guidance for payment in the second country.

8. The portable electronic device of claim 1, wherein the instructions are further configured to cause the portable electronic device to identify that the country in which the portable electronic device is located is changed based on at least one of a mobile country code (MCC), a mobile network code (MNC), or global positioning system (GPS) location information.

9. A method for supporting mobile payment in a portable electronic device, the method comprising:
identifying that a country in which the portable electronic device is located is changed;
if the country in which the portable electronic device is located is changed from a first country to a second country, displaying information on an available form of payment for the second country;
displaying a guidance for the available form of payment in the second country based on payment-related configuration information while a payment application is executed;
selecting a form of payment by a user input;
in response to the selection, changing a first authentication method for the first country to a second authentication method for the second country; and
performing, using the payment application stored in a memory of the portable electronic device, payment using one of a plurality of tokens pre-stored in the memory based on the second authentication method with the selected form,
wherein the first authentication method is associated with information on the first country that includes a one-time payment token, and
wherein the second authentication method is associated with information on the second country that includes using a the plurality of tokens, and
wherein the guidance includes information that an overseas payment is required.

10. The method of claim 9,
wherein the first authentication method is a method in which a payment token required to perform payment is issued from an external server at every payment, and
wherein the second authentication method is a method in which any one of a plurality of pre-stored payment tokens is used.

11. The method of claim 9, wherein the changing of the first authentication method to the second authentication method corresponding to the information on the second country comprises:
obtaining configuration information including at least one security policy to be applied at a time of payment corresponding to the second country; and
changing to the second authentication method based on the configuration information.

12. The method of claim 11, wherein the at least one security policy includes at least one of a security policy supported by the portable electronic device itself, a security policy for each country supporting overseas payment, a security policy for each form of payment supporting overseas payment, a security policy according to a payment method, or a security policy according to a payment amount.

13. The method of claim 10, further comprising:
issuing a device nonce for authentication on the plurality of pre-stored payment tokens according to a request to execute the payment application and transmitting the device nonce to a payment server connected to a financial server to perform authentication between the financial server and an authentication server; and
completing authentication of the plurality of pre-stored payment tokens by receiving a verification result for the device nonce from the payment server.

14. The method of claim 13, wherein the transmitting of the device nonce to the payment server comprises:

requesting authentication on biometric information from the authentication server according to the request to execute the payment application; and transmitting the device nonce to the payment server when the authentication on the biometric information by the authentication server is successful.

15. The method of claim 9, further comprising:
obtaining configuration information including at least one security policy to be applied at a time of payment corresponding to the second country in response to reception of a user's selection after displaying the guidance for payment in the second country.

16. The method of claim 9, wherein the identifying that the country in which the portable electronic device is located is changed comprises:
identifying that the country in which the portable electronic device is located is changed based on at least one of a mobile country code (MCC), a mobile network code (MNC), or global positioning system (GPS) location information.

17. At least one non-transitory storage medium configured to store instructions, the instructions being configured to cause a portable electronic device to perform at least one operation when the instructions are executed by at least one processor of the portable electronic device, the at least one operation comprising:
identifying that a country in which the portable electronic device is located is changed;
if the country in which the portable electronic device is located is changed from a first country to a second country, displaying information on an available form of payment for the second country;
displaying a guidance for the available form of payment in the second country based on payment-related configuration information while a payment application is executed;
selecting a form of payment by a user input;
in response to the selection, changing a first authentication method for the first country to a second authentication method for the second country; and
performing, using the payment application stored in a memory of the portable electronic device, payment using one of a plurality of tokens pre-stored in the memory based on the second authentication method with the selected form,
wherein the first authentication method is associated with information on the first country that includes a one-time payment token,
wherein the second authentication method is associated with information on the second country that includes using the plurality of tokens, and
wherein the guidance includes information that an overseas payment is required.

\* \* \* \* \*